United States Patent
Baek et al.

(10) Patent No.: US 12,553,056 B2
(45) Date of Patent: Feb. 17, 2026

(54) MODIFIED POLYPEPTIDE OF MESO-DIAMINOPIMELATE DEHYDROGENASE AND POLYNUCLEOTIDE ENCODING THE MODIFIED POLYPEPTIDE

(71) Applicant: CJ CHEILJEDANG CORPORATION, Seoul (KR)

(72) Inventors: Mina Baek, Seoul (KR); Seung-ju Son, Seoul (KR); Su Yon Kwon, Seoul (KR); Imsang Lee, Seoul (KR); Kwang Woo Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 772 days.

(21) Appl. No.: 17/623,218

(22) PCT Filed: Aug. 13, 2020

(86) PCT No.: PCT/KR2020/010738
§ 371 (c)(1),
(2) Date: Dec. 27, 2021

(87) PCT Pub. No.: WO2021/060701
PCT Pub. Date: Apr. 1, 2021

(65) Prior Publication Data
US 2022/0356479 A1 Nov. 10, 2022

(30) Foreign Application Priority Data
Sep. 26, 2019 (KR) .................. 10-2019-0119058

(51) Int. Cl.
| | | |
|---|---|---|
| C12N 15/17 | (2006.01) | |
| C12N 9/02 | (2006.01) | |
| C12N 9/06 | (2006.01) | |
| C12N 9/88 | (2006.01) | |
| C12N 15/77 | (2006.01) | |
| C12P 13/08 | (2006.01) | |
| C40B 40/02 | (2006.01) | |
| C40B 40/08 | (2006.01) | |
| C12N 15/10 | (2006.01) | |
| C12R 1/15 | (2006.01) | |

(52) U.S. Cl.
CPC .......... *C12N 15/77* (2013.01); *C12N 9/0016* (2013.01); *C12N 9/0093* (2013.01); *C12N 9/88* (2013.01); *C12P 13/08* (2013.01); *C40B 40/02* (2013.01); *C40B 40/08* (2013.01); *C12N 15/1034* (2013.01); *C12R 2001/15* (2021.05); *C12Y 104/01016* (2013.01); *C12Y 117/01* (2013.01); *C12Y 401/0102* (2013.01); *C12Y 403/03007* (2015.07)

(58) Field of Classification Search
CPC .... C12N 15/77; C12N 9/0016; C12N 9/0093; C12N 9/88; C12N 15/1034; C12P 13/08; C40B 40/02; C40B 40/08; C12R 2001/15; C12Y 104/01016; C12Y 117/01; C12Y 401/0102; C12Y 403/03007; C07K 2319/00; C07K 2319/30; A61P 35/00
See application file for complete search history.

(56) References Cited

U.S. PATENT DOCUMENTS 7,550,277 B2 * 6/2009 Rozzell ................ C12N 9/0016
435/189
8,048,650 B2 11/2011 Koo et al.

FOREIGN PATENT DOCUMENTS

| JP | 2010-226957 A | 10/2010 |
|---|---|---|
| KR | 10-2007-0036139 A | 4/2007 |
| KR | 10-2008-0028940 A | 4/2008 |
| KR | 10-2016-0030053 A | 3/2016 |
| KR | 10-1865998 B1 | 6/2018 |
| WO | WO 2006/113085 A2 | 10/2006 |

OTHER PUBLICATIONS

Sadowski MI, Jones DT. The sequence-structure relationship and protein function prediction. Curr Opin Struct Biol. Jun. 2009;19(3): 357-62. doi: 10.1016/j.sbi.2009.03.008. Epub May 4, 2009. PMID: 19406632. (Year: 2009).*
Seffernick JL, de Souza ML, Sadowsky MJ, Wackett LP. Melamine deaminase and atrazine chlorohydrolase: 98 percent identical but functionally different. J Bacteriol. Apr. 2001;183(8):2405-10. doi: 10.1128/JB.183.8.2405-2410.2001. PMID: 11274097; PMCID: PMC95154. (Year: 2001).*
Tang S, Edwards EA. Identification of Dehalobacter reductive dehalogenases that catalyse dechlorination of chloroform, 1,1,1-trichloroethane and 1,1-dichloroethane. Philos Trans R Soc Lond B Biol Sci. Mar. 11, 2013;368(1616):20120318. doi: 10.1098/rstb 2012.0318. PMID: 23479748; PMCID: PMC3638459. (Year: 2013).*
Reddy SG, Scapin G, Blanchard JS. Expression, purification, and crystallization of meso-diaminopimelate dehydrogenase from Corynebacterium glutamicum. Proteins. Aug. 1996;25(4):514-6. doi: 10.1002/prot.12. PMID: 8865347. (Year: 1996).*
Sousa S et al. The ARO4 gene of Candida albicans encodes a tyrosine-sensitive DAHP synthase: evolution, functional conservation and phenotype of Aro3p-, Aro4p-deficient mutants. Microbiology (Reading). May 2002;148(Pt 5):1291-1303. doi: 10.1099/00221287-148-5-1291. PMID: 11988503. (Year: 2002).*
The English translation of the International Search Report of PCT/KR2020/010738 mailed Dec. 7, 2020.

(Continued)

Primary Examiner — Robert B Mondesi
(74) Attorney, Agent, or Firm — Squire Patton Boggs (US) LLP

(57) ABSTRACT

The present disclosure relates to a modified polypeptide, in which the activity of meso-diaminopimelate is weakened, and a method for producing L-threonine using the same.

11 Claims, No Drawings
Specification includes a Sequence Listing.

(56) References Cited

OTHER PUBLICATIONS

NCBI, GenBank Accession No. WP_011015254.1, "diaminopimelate dehydrogenase [Corynebacterium glutamicum]", Jun. 3, 2019.

Xunyan Dong et al., "Attenuating L-lysine production by deletion of ddh and lysE and their effect on L-threonine and L-isoleucine", Enzyme and microbial technology, 2016; DOI: http://dx.doi.org/doi:10.1016/j.enzmictec.2016.07.013.

Extended European Search Report of EP application No. 20870240.7 dated Jul. 5, 2022; 6 pages.

Dong et al., "Attenuating L-lysine production by deletion of ddh and lysE and their effect on L-threonine and L-isoleucine production in Corynebacterium glutamicum", Enzyme and Microbial Technology, 2016, vol. 93-94, pp. 70-78; http://dx.doi.org/doi:10.1016/j.enzmictec.2016.07.013.

\* cited by examiner

SEQUENCE LISTING

<160> NUMBER OF SEQ ID NOS: 83

<210> SEQ ID NO 1
<211> LENGTH: 320
<212> TYPE: PRT
<213> ORGANISM: Unknown
<220> FEATURE:
<223> OTHER INFORMATION: DDH (meso-diaminopimelate dehydrogenase)

<400> SEQUENCE: 1

Met Thr Asn Ile Arg Val Ala Ile Val Gly Tyr Gly Asn Leu Gly Arg
1               5                   10                  15

```
Ser Val Glu Lys Leu Ile Ala Lys Gln Pro Asp Met Asp Leu Val Gly
         20                  25                  30

Ile Phe Ser Arg Arg Ala Thr Leu Asp Thr Lys Thr Pro Val Phe Asp
             35                  40                  45

Val Ala Asp Val Asp Lys His Ala Asp Asp Val Asp Val Leu Phe Leu
 50                  55                  60

Cys Met Gly Ser Ala Thr Asp Ile Pro Glu Gln Ala Pro Lys Phe Ala
 65                  70                  75                  80

Gln Phe Ala Cys Thr Val Asp Thr Tyr Asp Asn His Arg Asp Ile Pro
                 85                  90                  95

Arg His Arg Gln Val Met Asn Glu Ala Ala Thr Ala Ala Gly Asn Val
            100                 105                 110

Ala Leu Val Ser Thr Gly Trp Asp Pro Gly Met Phe Ser Ile Asn Arg
            115                 120                 125

Val Tyr Ala Ala Ala Val Leu Ala Glu His Gln Gln His Thr Phe Trp
130                 135                 140

Gly Pro Gly Leu Ser Gln Gly His Ser Asp Ala Leu Arg Arg Ile Pro
145                 150                 155                 160

Gly Val Gln Lys Ala Val Gln Tyr Thr Leu Pro Ser Glu Asp Ala Leu
                165                 170                 175

Glu Lys Ala Arg Arg Gly Glu Ala Gly Asp Leu Thr Gly Lys Gln Thr
            180                 185                 190

His Lys Arg Gln Cys Phe Val Val Ala Asp Ala Ala Asp His Glu Arg
            195                 200                 205

Ile Glu Asn Asp Ile Arg Thr Met Pro Asp Tyr Phe Val Gly Tyr Glu
    210                 215                 220

Val Glu Val Asn Phe Ile Asp Glu Ala Thr Phe Asp Ser Glu His Thr
225                 230                 235                 240

Gly Met Pro His Gly Gly His Val Ile Thr Thr Gly Asp Thr Gly Gly
                245                 250                 255

Phe Asn His Thr Val Glu Tyr Ile Leu Lys Leu Asp Arg Asn Pro Asp
            260                 265                 270

Phe Thr Ala Ser Ser Gln Ile Ala Phe Gly Arg Ala Ala His Arg Met
            275                 280                 285

Lys Gln Gln Gly Gln Ser Gly Ala Phe Thr Val Leu Glu Val Ala Pro
    290                 295                 300

Tyr Leu Leu Ser Pro Glu Asn Leu Asp Asp Leu Ile Ala Arg Asp Val
305                 310                 315                 320

<210> SEQ ID NO 2
<211> LENGTH: 963
<212> TYPE: DNA
<213> ORGANISM: Unknown
<220> FEATURE:
<223> OTHER INFORMATION: gene of DDH (meso-diaminopimelate
      dehydrogenase)

<400> SEQUENCE: 2
atgaccaaca tccgcgtagc tatcgtgggc tacggaaacc tgggacgcag cgtcgaaaag      60
cttattgcca agcagcccga catggacctt gtaggaatct tctcgcgccg ggccacccca     120
gacacaaaga cgccagtctt tgatgtcgcc gacgtggaca agcacgccga cgacgtggac     180
gtgctgttcc tgtgcatggg ctccgccacc gacatccctg agcaggcacc aaagttcgcg     240
cagttcgcct gcaccgtaga cacctacgac aaccaccgcg acatcccacg ccaccgccag     300
```

```
gtcatgaacg aagccgccac cgcagccggc aacgttgcac tggtctctac cggctgggat    360
ccaggaatgt tctccatcaa ccgcgtctac gcagcggcag tcttagccga gcaccagcag    420
cacaccttct ggggcccagg tttgtcacag gccactccg atgctttgcg acgcatccct    480
ggcgttcaaa aggcagtcca gtacaccctc ccatccgaag acgccctgga aaggcccgc    540
cgcggcgaag ccggcgacct taccggaaag caaacccaca agcgccaatg cttcgtggtt    600
gccgacgcgg ccgatcacga gcgcatcgaa acgacatcc gcaccatgcc tgattacttc    660
gttggctacg aagtcgaagt caacttcatc gacgaagcaa ccttcgactc cgagcacacc    720
ggcatgccac acgtgggcca cgtgattacc accggcgaca ccgtggcctt caaccacacc    780
gtggaataca tcctcaagct ggaccgaaac ccagatttca ccgcttcctc acagatcgct    840
ttcggtcgcg cagctcaccg catgaagcag cagggccaaa gcggagcttt caccgtcctc    900
gaagttgctc cataccgct ctccccagag aacttggacg atctgatcgc acgcgacgtc    960
taa                                                                 963

<210> SEQ ID NO 3
<211> LENGTH: 320
<212> TYPE: PRT
<213> ORGANISM: Unknown
<220> FEATURE:
<223> OTHER INFORMATION: modified DDH (meso-diaminopimelate
      dehydrogenase)

<400> SEQUENCE: 3

Met Thr Asn Ile Arg Val Ala Ile Val Gly Tyr Gly Asn Leu Gly Arg
1               5                   10                  15

Ser Val Glu Lys Leu Ile Ala Lys Gln Pro Asp Met Asp Leu Val Gly
            20                  25                  30

Ile Phe Ser Arg Arg Ala Thr Leu Asp Thr Lys Thr Pro Val Phe Asp
        35                  40                  45

Val Ala Asp Val Asp Lys His Ala Asp Val Asp Val Leu Phe Leu
    50                  55                  60

Cys Met Gly Ser Ala Thr Asp Ile Pro Glu Gln Ala Pro Lys Phe Ala
65                  70                  75                  80

Gln Phe Ala Cys Thr Val Asp Thr Tyr Asp Asn His Arg Asp Ile Pro
                85                  90                  95

Arg His Arg Gln Val Met Asn Glu Ala Ala Thr Ala Ala Gly Asn Val
            100                 105                 110

Ala Leu Val Ser Thr Gly Trp Asp Pro Gly Met Phe Ser Ile Asn Arg
        115                 120                 125

Val Tyr Ala Ala Val Leu Ala Glu His Gln Gln His Thr Phe Trp
    130                 135                 140

Gly Pro Gly Leu Ser Gln Gly His Ser Asp Ala Leu Arg Arg Ile Pro
145                 150                 155                 160

Gly Val Gln Lys Ala Val Gln Tyr Leu Leu Pro Ser Glu Asp Ala Leu
                165                 170                 175

Glu Lys Ala Arg Arg Gly Glu Ala Gly Asp Leu Thr Gly Lys Gln Thr
            180                 185                 190

His Lys Arg Gln Cys Phe Val Val Ala Asp Ala Ala Asp His Glu Arg
        195                 200                 205

Ile Glu Asn Asp Ile Arg Thr Met Pro Asp Tyr Phe Val Gly Tyr Glu
    210                 215                 220

Val Glu Val Asn Phe Ile Asp Glu Ala Thr Phe Asp Ser Glu His Thr
225                 230                 235                 240
```

Gly Met Pro His Gly Gly His Val Ile Thr Thr Gly Asp Thr Gly
                245                 250                 255

Phe Asn His Thr Val Glu Tyr Ile Leu Lys Leu Asp Arg Asn Pro Asp
            260                 265                 270

Phe Thr Ala Ser Ser Gln Ile Ala Phe Gly Arg Ala Ala His Arg Met
        275                 280                 285

Lys Gln Gln Gly Gln Ser Gly Ala Phe Thr Val Leu Glu Val Ala Pro
    290                 295                 300

Tyr Leu Leu Ser Pro Glu Asn Leu Asp Asp Leu Ile Ala Arg Asp Val
305                 310                 315                 320

<210> SEQ ID NO 4
<211> LENGTH: 963
<212> TYPE: DNA
<213> ORGANISM: Unknown
<220> FEATURE:
<223> OTHER INFORMATION: gene of modified DDH (meso-diaminopimelate
      dehydrogenase)

<400> SEQUENCE: 4
atgaccaaca tccgcgtagc tatcgtgggc tacggaaacc tgggacgcag cgtcgaaaag      60
cttattgcca agcagcccga catggacctt gtaggaatct tctcgcgccg ggccacccTC     120
gacacaaaga cgccagtctt tgatgtcgcc gacgtggaca gcacgccga cgacgtggac     180 gtgctgttcc tgtgcatggg ctccgccacc gacatccctg agcaggcacc aaagttcgcg     240
cagttcgcct gcaccgtaga cacctacgac aaccaccgcg acatcccacg ccaccgccag     300
gtcatgaacg aagccgccac cgcagccggc aacgttgcac tggtctctac cggctgggat     360
ccaggaatgt ctccatcaa ccgcgtctac gcagcggcag tcttagccga gcaccagcag     420
cacaccttct ggggcccagg tttgtcacag ggccactccg atgctttgcg acgcatccct     480
ggcgttcaaa aggcagtcca gtacttactc ccatccgaag acgccctgga aaaggcccgc     540
cgcggcgaag ccggcgacct taccggaaag caaacccaca agcgccaatg cttcgtggtt     600
gccgacgcgg ccgatcacga gcgcatcgaa aacgacatcc gcaccatgcc tgattacttc     660
gttggctacg aagtcgaagt caacttcatc gacgaagcaa ccttcgactc cgagcacacc     720
ggcatgccac acggtggcca cgtgattacc accggcgaca ccggtggctt caaccacacc     780
gtggaataca tcctcaagct ggaccgaaac ccagatttca ccgcttcctc acagatcgct     840
ttcggtcgcg cagctcaccg catgaagcag cagggccaaa gcggagcttt caccgtcctc     900
gaagttgctc cataCctgct ctccccagag aacttggacg atctgatcgc acgcgacgtc     960
taa                                                                    963

<210> SEQ ID NO 5
<211> LENGTH: 20
<212> TYPE: DNA
<213> ORGANISM: Artificial Sequence
<220> FEATURE:
<223> OTHER INFORMATION: primer

<400> SEQUENCE: 5
atgaccaaca tccgcgtagc                                                   20

<210> SEQ ID NO 6
<211> LENGTH: 21
<212> TYPE: DNA
<213> ORGANISM: Artificial Sequence
<220> FEATURE:

<223> OTHER INFORMATION: primer

<400> SEQUENCE: 6
ttagacgtcg cgtgcgatca g                                         21

<210> SEQ ID NO 7
<211> LENGTH: 30
<212> TYPE: DNA
<213> ORGANISM: Artificial Sequence
<220> FEATURE:
<223> OTHER INFORMATION: primer

<400> SEQUENCE: 7
cggggatcct ctagatgacc aacatccgcg                                30

<210> SEQ ID NO 8
<211> LENGTH: 31
<212> TYPE: DNA
<213> ORGANISM: Artificial Sequence
<220> FEATURE:
<223> OTHER INFORMATION: primer

<400> SEQUENCE: 8
caggtcgact ctagattaga cgtcgcgtgc g                              31

<210> SEQ ID NO 9
<211> LENGTH: 27
<212> TYPE: DNA
<213> ORGANISM: Artificial Sequence
<220> FEATURE:
<223> OTHER INFORMATION: primer

<400> SEQUENCE: 9
cggtgaaatc ggcgacatca aagactg                                   27

<210> SEQ ID NO 10
<211> LENGTH: 26
<212> TYPE: DNA
<213> ORGANISM: Artificial Sequence
<220> FEATURE:
<223> OTHER INFORMATION: primer

<400> SEQUENCE: 10
gatgtcgccg atttcaccgc ttcctc                                    26

<210> SEQ ID NO 11
<211> LENGTH: 30
<212> TYPE: DNA
<213> ORGANISM: Artificial Sequence
<220> FEATURE:
<223> OTHER INFORMATION: primer

<400> SEQUENCE: 11
cggggatcct ctagatgacc aacatccgcg                                30

<210> SEQ ID NO 12
<211> LENGTH: 31
<212> TYPE: DNA
<213> ORGANISM: Artificial Sequence
<220> FEATURE:
<223> OTHER INFORMATION: primer

<400> SEQUENCE: 12
caggtcgact ctagattaga cgtcgcgtgc g                              31

-continued

```
<210> SEQ ID NO 13
<211> LENGTH: 19
<212> TYPE: DNA
<213> ORGANISM: Artificial Sequence
<220> FEATURE:
<223> OTHER INFORMATION: primer

<400> SEQUENCE: 13
cacaattttg gaggattac                                                  19

<210> SEQ ID NO 14
<211> LENGTH: 19
<212> TYPE: DNA
<213> ORGANISM: Artificial Sequence
<220> FEATURE:
<223> OTHER INFORMATION: primer

<400> SEQUENCE: 14
tgggtgacca cgatcagat                                                  19

<210> SEQ ID NO 15
<211> LENGTH: 18
<212> TYPE: DNA
<213> ORGANISM: Artificial Sequence
<220> FEATURE:
<223> OTHER INFORMATION: primer

<400> SEQUENCE: 15
ggaaaccaca ctgtttcc                                                   18

<210> SEQ ID NO 16
<211> LENGTH: 421
<212> TYPE: PRT
<213> ORGANISM: Unknown
<220> FEATURE:
<223> OTHER INFORMATION: modified LysC (lysine-sensitive aspartokinase
      3)

<400> SEQUENCE: 16

Met Ala Leu Val Val Gln Lys Tyr Gly Gly Ser Ser Leu Glu Ser Ala
1               5                   10                  15

Glu Arg Ile Arg Asn Val Ala Glu Arg Ile Val Ala Thr Lys Lys Ala
            20                  25                  30

Gly Asn Asp Val Val Val Val Cys Ser Ala Met Gly Asp Thr Thr Asp
        35                  40                  45

Glu Leu Leu Glu Leu Ala Ala Ala Val Asn Pro Val Pro Pro Ala Arg
    50                  55                  60

Glu Met Asp Met Leu Leu Thr Ala Gly Glu Arg Ile Ser Asn Ala Leu
65                  70                  75                  80

Val Ala Met Ala Ile Glu Ser Leu Gly Ala Glu Ala Gln Ser Phe Thr
                85                  90                  95

Gly Ser Gln Ala Gly Val Leu Thr Thr Glu Arg His Gly Asn Ala Arg
            100                 105                 110

Ile Val Asp Val Thr Pro Gly Arg Val Arg Glu Ala Leu Asp Glu Gly
        115                 120                 125

Lys Ile Cys Ile Val Ala Gly Phe Gln Gly Val Asn Lys Glu Thr Arg
    130                 135                 140

Asp Val Thr Thr Leu Gly Arg Gly Gly Ser Asp Thr Thr Ala Val Ala
145                 150                 155                 160

Leu Ala Ala Ala Leu Asn Ala Asp Val Cys Glu Ile Tyr Ser Asp Val
                165                 170                 175
```

Asp Gly Val Tyr Thr Ala Asp Pro Arg Ile Val Pro Asn Ala Gln Lys
              180                 185                 190

Leu Glu Lys Leu Ser Phe Glu Glu Met Leu Glu Leu Ala Ala Val Gly
         195                 200                 205

Ser Lys Ile Leu Val Leu Arg Ser Val Glu Tyr Ala Arg Ala Phe Asn
     210                 215                 220

Val Pro Leu Arg Val Arg Ser Ser Tyr Ser Asn Asp Pro Gly Thr Leu
225                 230                 235                 240

Ile Ala Gly Ser Met Glu Asp Ile Pro Val Glu Glu Ala Val Leu Thr
                245                 250                 255

Gly Val Ala Thr Asp Lys Ser Glu Ala Lys Val Thr Val Leu Gly Ile
            260                 265                 270

Ser Asp Lys Pro Gly Glu Ala Ala Lys Val Phe Arg Ala Leu Ala Asp
        275                 280                 285

Ala Glu Ile Asn Ile Asp Met Val Leu Gln Asn Val Ser Ser Val Glu
    290                 295                 300

Asp Gly Thr Thr Asp Ile Thr Phe Thr Cys Pro Arg Ser Asp Gly Arg
305                 310                 315                 320

Arg Ala Met Glu Ile Leu Lys Lys Leu Gln Val Gln Gly Asn Trp Thr
                325                 330                 335

Asn Val Leu Tyr Asp Asp Gln Val Gly Lys Val Ser Leu Val Gly Ala
            340                 345                 350

Gly Met Lys Ser His Pro Gly Val Thr Ala Glu Phe Met Glu Ala Leu
        355                 360                 365

Arg Asp Val Asn Val Asn Ile Glu Lys Ile Ser Thr Ser Glu Ile Arg
    370                 375                 380

Ile Ser Val Leu Ile Arg Glu Asp Asp Leu Asp Ala Ala Ala Arg Ala
385                 390                 395                 400

Leu His Glu Gln Phe Gln Leu Gly Gly Glu Asp Glu Ala Val Val Tyr
                405                 410                 415

Ala Gly Thr Gly Arg
            420

<210> SEQ ID NO 17
<211> LENGTH: 34
<212> TYPE: DNA
<213> ORGANISM: Artificial Sequence
<220> FEATURE:
<223> OTHER INFORMATION: primer

<400> SEQUENCE: 17
tcgagctcgg tacccgctgc gcagtgttga atac                                      34

<210> SEQ ID NO 18
<211> LENGTH: 30
<212> TYPE: DNA
<213> ORGANISM: Artificial Sequence
<220> FEATURE:
<223> OTHER INFORMATION: primer

<400> SEQUENCE: 18
tggaaatctt ttcgatgttc acgttgacat                                           30

<210> SEQ ID NO 19
<211> LENGTH: 30
<212> TYPE: DNA
<213> ORGANISM: Artificial Sequence
<220> FEATURE:
<223> OTHER INFORMATION: primer

<400> SEQUENCE: 19
atgtcaacgt gaacatcgaa aagatttcca                                    30

<210> SEQ ID NO 20
<211> LENGTH: 34
<212> TYPE: DNA
<213> ORGANISM: Artificial Sequence
<220> FEATURE:
<223> OTHER INFORMATION: primer

<400> SEQUENCE: 20
ctctagagga tccccgttca cctcagagac gatt                               34

<210> SEQ ID NO 21
<211> LENGTH: 445
<212> TYPE: PRT
<213> ORGANISM: Unknown
<220> FEATURE:
<223> OTHER INFORMATION: modified Hom (homoserine dehydrogenase)

<400> SEQUENCE: 21

Met Thr Ser Ala Ser Ala Pro Ser Phe Asn Pro Gly Lys Gly Pro Gly
1               5                   10                  15

Ser Ala Val Gly Ile Ala Leu Leu Gly Phe Gly Thr Val Gly Thr Glu
            20                  25                  30

Val Met Arg Leu Met Thr Glu Tyr Gly Asp Glu Leu Ala His Arg Ile
        35                  40                  45

Gly Gly Pro Leu Glu Val Arg Gly Ile Ala Val Ser Asp Ile Ser Lys
    50                  55                  60

Pro Arg Glu Gly Val Ala Pro Glu Leu Leu Thr Glu Asp Ala Phe Ala
65                  70                  75                  80

Leu Ile Glu Arg Glu Asp Val Asp Ile Val Val Glu Val Ile Gly Gly
                85                  90                  95

Ile Glu Tyr Pro Arg Glu Val Val Leu Ala Ala Leu Lys Ala Gly Lys
            100                 105                 110

Ser Val Val Thr Ala Asn Lys Ala Leu Val Ala Ala His Ser Ala Glu
        115                 120                 125

Leu Ala Asp Ala Ala Glu Ala Ala Asn Val Asp Leu Tyr Phe Glu Ala
    130                 135                 140

Ala Val Ala Gly Ala Ile Pro Val Val Gly Pro Leu Arg Arg Ser Leu
145                 150                 155                 160

Ala Gly Asp Gln Ile Gln Ser Val Met Gly Ile Val Asn Gly Thr Thr
                165                 170                 175

Asn Phe Ile Leu Asp Ala Met Asp Ser Thr Gly Ala Asp Tyr Ala Asp
            180                 185                 190

Ser Leu Ala Glu Ala Thr Arg Leu Gly Tyr Ala Glu Ala Asp Pro Thr
        195                 200                 205

Ala Asp Val Glu Gly His Asp Ala Ala Ser Lys Ala Ala Ile Leu Ala
    210                 215                 220

Ser Ile Ala Phe His Thr Arg Val Thr Ala Asp Asp Val Tyr Cys Glu
225                 230                 235                 240

Gly Ile Ser Asn Ile Ser Ala Ala Asp Ile Glu Ala Ala Gln Gln Ala
                245                 250                 255

Gly His Thr Ile Lys Leu Leu Ala Ile Cys Glu Lys Phe Thr Asn Lys
            260                 265                 270

Glu Gly Lys Ser Ala Ile Ser Ala Arg Val His Pro Thr Leu Leu Pro

```
              275                 280                 285
Val Ser His Pro Leu Ala Ser Val Asn Lys Ser Phe Asn Ala Ile Phe
    290                 295                 300

Val Glu Ala Glu Ala Ala Gly Arg Leu Met Phe Tyr Gly Asn Gly Ala
305                 310                 315                 320

Gly Gly Ala Pro Thr Ala Ser Ala Val Leu Gly Asp Val Val Gly Ala
                325                 330                 335

Ala Arg Asn Lys Val His Gly Gly Arg Ala Pro Gly Glu Ser Thr Tyr
            340                 345                 350

Ala Asn Leu Pro Ile Ala Asp Phe Gly Glu Thr Thr Arg Tyr His
        355                 360                 365

Leu Asp Met Asp Val Glu Asp Arg Val Gly Val Leu Ala Glu Leu Ala
    370                 375                 380

Ser Leu Phe Ser Glu Gln Gly Ile Ser Leu Arg Thr Ile Arg Gln Glu
385                 390                 395                 400

Glu Arg Asp Asp Ala His Leu Ile Val Val Thr His Ser Ala Leu
                405                 410                 415

Glu Ser Asp Leu Ser Arg Thr Val Glu Leu Leu Lys Ala Lys Pro Val
            420                 425                 430

Val Lys Ala Ile Asn Ser Val Ile Arg Leu Glu Arg Asp
        435                 440                 445

<210> SEQ ID NO 22
<211> LENGTH: 33
<212> TYPE: DNA
<213> ORGANISM: Artificial Sequence
<220> FEATURE:
<223> OTHER INFORMATION: primer

<400> SEQUENCE: 22
tcgagctcgg taccccggat gatgtgtact gcg                              33

<210> SEQ ID NO 23
<211> LENGTH: 31
<212> TYPE: DNA
<213> ORGANISM: Artificial Sequence
<220> FEATURE:
<223> OTHER INFORMATION: primer

<400> SEQUENCE: 23
gaccacgatc agatgtgcat catcatcgcg c                                31

<210> SEQ ID NO 24
<211> LENGTH: 31
<212> TYPE: DNA
<213> ORGANISM: Artificial Sequence
<220> FEATURE:
<223> OTHER INFORMATION: primer

<400> SEQUENCE: 24
gatgatgatg cacatctgat cgtggtcacc c                                31

<210> SEQ ID NO 25
<211> LENGTH: 33
<212> TYPE: DNA
<213> ORGANISM: Artificial Sequence
<220> FEATURE:
<223> OTHER INFORMATION: primer

<400> SEQUENCE: 25
ctctagagga tccccgagtc agcgggaaat ccg                              33
```

<210> SEQ ID NO 26
<211> LENGTH: 34
<212> TYPE: DNA
<213> ORGANISM: Artificial Sequence
<220> FEATURE:
<223> OTHER INFORMATION: primer

<400> SEQUENCE: 26
cggggatcct ctagaatgac caacatccgc gtag          34

<210> SEQ ID NO 27
<211> LENGTH: 34
<212> TYPE: DNA
<213> ORGANISM: Artificial Sequence
<220> FEATURE:
<223> OTHER INFORMATION: primer

<400> SEQUENCE: 27
caggtcgact ctagattaga cgtcgcgtgc gatc          34

<210> SEQ ID NO 28
<211> LENGTH: 30
<212> TYPE: DNA
<213> ORGANISM: Artificial Sequence
<220> FEATURE:
<223> OTHER INFORMATION: primer

<400> SEQUENCE: 28
tccagtacgc tctcccatcc gaagacgccc               30

<210> SEQ ID NO 29
<211> LENGTH: 30
<212> TYPE: DNA
<213> ORGANISM: Artificial Sequence
<220> FEATURE:
<223> OTHER INFORMATION: primer

<400> SEQUENCE: 29
ggatgggaga gcgtactgga ctgccttttg               30

<210> SEQ ID NO 30
<211> LENGTH: 30
<212> TYPE: DNA
<213> ORGANISM: Artificial Sequence
<220> FEATURE:
<223> OTHER INFORMATION: primer

<400> SEQUENCE: 30
tccagtacgt cctcccatcc gaagacgccc               30

<210> SEQ ID NO 31
<211> LENGTH: 30
<212> TYPE: DNA
<213> ORGANISM: Artificial Sequence
<220> FEATURE:
<223> OTHER INFORMATION: primer

<400> SEQUENCE: 31
ggatgggagg acgtactgga ctgccttttg               30

<210> SEQ ID NO 32
<211> LENGTH: 30
<212> TYPE: DNA
<213> ORGANISM: Artificial Sequence
<220> FEATURE:

<223> OTHER INFORMATION: primer

<400> SEQUENCE: 32
tccagtacca gctcccatcc gaagacgccc                                    30

<210> SEQ ID NO 33
<211> LENGTH: 30
<212> TYPE: DNA
<213> ORGANISM: Artificial Sequence
<220> FEATURE:
<223> OTHER INFORMATION: primer

<400> SEQUENCE: 33
ggatgggagc tggtactgga ctgccttttg                                    30

<210> SEQ ID NO 34
<211> LENGTH: 30
<212> TYPE: DNA
<213> ORGANISM: Artificial Sequence
<220> FEATURE:
<223> OTHER INFORMATION: primer

<400> SEQUENCE: 34
tccagtacca cctcccatcc gaagacgccc                                    30

<210> SEQ ID NO 35
<211> LENGTH: 30
<212> TYPE: DNA
<213> ORGANISM: Artificial Sequence
<220> FEATURE:
<223> OTHER INFORMATION: primer

<400> SEQUENCE: 35
ggatgggagg tggtactgga ctgccttttg                                    30

<210> SEQ ID NO 36
<211> LENGTH: 30
<212> TYPE: DNA
<213> ORGANISM: Artificial Sequence
<220> FEATURE:
<223> OTHER INFORMATION: primer

<400> SEQUENCE: 36
tccagtaccg actcccatcc gaagacgccc                                    30

<210> SEQ ID NO 37
<211> LENGTH: 30
<212> TYPE: DNA
<213> ORGANISM: Artificial Sequence
<220> FEATURE:
<223> OTHER INFORMATION: primer

<400> SEQUENCE: 37
ggatgggagt cggtactgga ctgccttttg                                    30

<210> SEQ ID NO 38
<211> LENGTH: 30
<212> TYPE: DNA
<213> ORGANISM: Artificial Sequence
<220> FEATURE:
<223> OTHER INFORMATION: primer

<400> SEQUENCE: 38
tccagtaccc tctcccatcc gaagacgccc                                    30

-continued

```
<210> SEQ ID NO 39
<211> LENGTH: 30
<212> TYPE: DNA
<213> ORGANISM: Artificial Sequence
<220> FEATURE:
<223> OTHER INFORMATION: primer

<400> SEQUENCE: 39
ggatgggaga gggtactgga ctgccttttg                                30

<210> SEQ ID NO 40
<211> LENGTH: 30
<212> TYPE: DNA
<213> ORGANISM: Artificial Sequence
<220> FEATURE:
<223> OTHER INFORMATION: primer

<400> SEQUENCE: 40
tccagtactt actcccatcc gaagacgccc                                30

<210> SEQ ID NO 41
<211> LENGTH: 30
<212> TYPE: DNA
<213> ORGANISM: Artificial Sequence
<220> FEATURE:
<223> OTHER INFORMATION: primer

<400> SEQUENCE: 41
ggatgggagt aagtactgga ctgccttttg                                30

<210> SEQ ID NO 42
<211> LENGTH: 30
<212> TYPE: DNA
<213> ORGANISM: Artificial Sequence
<220> FEATURE:
<223> OTHER INFORMATION: primer

<400> SEQUENCE: 42
tccagtacta cctcccatcc gaagacgccc                                30

<210> SEQ ID NO 43
<211> LENGTH: 30
<212> TYPE: DNA
<213> ORGANISM: Artificial Sequence
<220> FEATURE:
<223> OTHER INFORMATION: primer

<400> SEQUENCE: 43
ggatgggagg tagtactgga ctgccttttg                                30

<210> SEQ ID NO 44
<211> LENGTH: 30
<212> TYPE: DNA
<213> ORGANISM: Artificial Sequence
<220> FEATURE:
<223> OTHER INFORMATION: primer

<400> SEQUENCE: 44
tccagtactc cctcccatcc gaagacgccc                                30

<210> SEQ ID NO 45
<211> LENGTH: 30
<212> TYPE: DNA
<213> ORGANISM: Artificial Sequence
<220> FEATURE:
<223> OTHER INFORMATION: primer
```

<400> SEQUENCE: 45
ggatgggagg gagtactgga ctgccttttg                                    30

<210> SEQ ID NO 46
<211> LENGTH: 30
<212> TYPE: DNA
<213> ORGANISM: Artificial Sequence
<220> FEATURE:
<223> OTHER INFORMATION: primer

<400> SEQUENCE: 46
tccagtacaa gctcccatcc gaagacgccc                                    30

<210> SEQ ID NO 47
<211> LENGTH: 30
<212> TYPE: DNA
<213> ORGANISM: Artificial Sequence
<220> FEATURE:
<223> OTHER INFORMATION: primer

<400> SEQUENCE: 47
ggatgggagc ttgtactgga ctgccttttg                                    30

<210> SEQ ID NO 48
<211> LENGTH: 30
<212> TYPE: DNA
<213> ORGANISM: Artificial Sequence
<220> FEATURE:
<223> OTHER INFORMATION: primer

<400> SEQUENCE: 48
tccagtacat gctcccatcc gaagacgccc                                    30

<210> SEQ ID NO 49
<211> LENGTH: 30
<212> TYPE: DNA
<213> ORGANISM: Artificial Sequence
<220> FEATURE:
<223> OTHER INFORMATION: primer

<400> SEQUENCE: 49
ggatgggagc atgtactgga ctgccttttg                                    30

<210> SEQ ID NO 50
<211> LENGTH: 30
<212> TYPE: DNA
<213> ORGANISM: Artificial Sequence
<220> FEATURE:
<223> OTHER INFORMATION: primer

<400> SEQUENCE: 50
tccagtacat cctcccatcc gaagacgccc                                    30

<210> SEQ ID NO 51
<211> LENGTH: 30
<212> TYPE: DNA
<213> ORGANISM: Artificial Sequence
<220> FEATURE:
<223> OTHER INFORMATION: primer

<400> SEQUENCE: 51
ggatgggagg atgtactgga ctgccttttg                                    30

<210> SEQ ID NO 52
<211> LENGTH: 30

<212> TYPE: DNA
<213> ORGANISM: Artificial Sequence
<220> FEATURE:
<223> OTHER INFORMATION: primer

<400> SEQUENCE: 52
tccagtacga actcccatcc gaagacgccc                                                    30

<210> SEQ ID NO 53
<211> LENGTH: 30
<212> TYPE: DNA
<213> ORGANISM: Artificial Sequence
<220> FEATURE:
<223> OTHER INFORMATION: primer

<400> SEQUENCE: 53
ggatgggagt tcgtactgga ctgccttttg                                                    30

<210> SEQ ID NO 54
<211> LENGTH: 30
<212> TYPE: DNA
<213> ORGANISM: Artificial Sequence
<220> FEATURE:
<223> OTHER INFORMATION: primer

<400> SEQUENCE: 54
tccagtacga tctcccatcc gaagacgccc                                                    30

<210> SEQ ID NO 55
<211> LENGTH: 30
<212> TYPE: DNA
<213> ORGANISM: Artificial Sequence
<220> FEATURE:
<223> OTHER INFORMATION: primer

<400> SEQUENCE: 55
ggatgggaga tcgtactgga ctgccttttg                                                    30

<210> SEQ ID NO 56
<211> LENGTH: 30
<212> TYPE: DNA
<213> ORGANISM: Artificial Sequence
<220> FEATURE:
<223> OTHER INFORMATION: primer

<400> SEQUENCE: 56
tccagtacgg tctcccatcc gaagacgccc                                                    30

<210> SEQ ID NO 57
<211> LENGTH: 30
<212> TYPE: DNA
<213> ORGANISM: Artificial Sequence
<220> FEATURE:
<223> OTHER INFORMATION: primer

<400> SEQUENCE: 57
ggatgggaga ccgtactgga ctgccttttg                                                    30

<210> SEQ ID NO 58
<211> LENGTH: 30
<212> TYPE: DNA
<213> ORGANISM: Artificial Sequence
<220> FEATURE:
<223> OTHER INFORMATION: primer

<400> SEQUENCE: 58

```
tccagtactg gctcccatcc gaagacgccc                                              30

<210> SEQ ID NO 59
<211> LENGTH: 30
<212> TYPE: DNA
<213> ORGANISM: Artificial Sequence
<220> FEATURE:
<223> OTHER INFORMATION: primer

<400> SEQUENCE: 59
ggatgggagc cagtactgga ctgccttttg                                              30

<210> SEQ ID NO 60
<211> LENGTH: 30
<212> TYPE: DNA
<213> ORGANISM: Artificial Sequence
<220> FEATURE:
<223> OTHER INFORMATION: primer

<400> SEQUENCE: 60
tccagtactg cctcccatcc gaagacgccc                                              30

<210> SEQ ID NO 61
<211> LENGTH: 30
<212> TYPE: DNA
<213> ORGANISM: Artificial Sequence
<220> FEATURE:
<223> OTHER INFORMATION: primer

<400> SEQUENCE: 61
ggatgggagg cagtactgga ctgccttttg                                              30

<210> SEQ ID NO 62
<211> LENGTH: 30
<212> TYPE: DNA
<213> ORGANISM: Artificial Sequence
<220> FEATURE:
<223> OTHER INFORMATION: primer

<400> SEQUENCE: 62
tccagtactt cctcccatcc gaagacgccc                                              30

<210> SEQ ID NO 63
<211> LENGTH: 30
<212> TYPE: DNA
<213> ORGANISM: Artificial Sequence
<220> FEATURE:
<223> OTHER INFORMATION: primer

<400> SEQUENCE: 63
ggatgggagg aagtactgga ctgccttttg                                              30

<210> SEQ ID NO 64
<211> LENGTH: 30
<212> TYPE: DNA
<213> ORGANISM: Artificial Sequence
<220> FEATURE:
<223> OTHER INFORMATION: primer

<400> SEQUENCE: 64
tccagtacaa cctcccatcc gaagacgccc                                              30

<210> SEQ ID NO 65
<211> LENGTH: 30
<212> TYPE: DNA
<213> ORGANISM: Artificial Sequence
```

<220> FEATURE:
<223> OTHER INFORMATION: primer

<400> SEQUENCE: 65
ggatgggagg ttgtactgga ctgccttttg					30

<210> SEQ ID NO 66
<211> LENGTH: 248
<212> TYPE: PRT
<213> ORGANISM: Unknown
<220> FEATURE:
<223> OTHER INFORMATION: modified DapB (dihydrodipicolinate reductase)

<400> SEQUENCE: 66

Met Gly Ile Lys Val Gly Val Leu Gly Ala Lys Gly Asn Val Gly Gln
1               5                   10                  15

Thr Ile Val Ala Ala Val Asn Glu Ser Asp Asp Leu Glu Leu Val Ala
            20                  25                  30

Glu Ile Gly Val Asp Asp Leu Ser Leu Leu Val Asp Asn Gly Ala
        35                  40                  45

Glu Val Val Val Asp Phe Thr Thr Pro Asn Ala Val Met Gly Asn Leu
    50                  55                  60

Glu Phe Cys Ile Asn Asn Gly Ile Ser Ala Val Val Gly Thr Thr Gly
65                  70                  75                  80

Phe Asp Asp Ala Arg Leu Glu Gln Val Arg Asp Trp Leu Glu Gly Lys
                85                  90                  95

Asp Asn Val Gly Val Leu Ile Ala Pro Asn Phe Ala Ile Ser Ala Val
            100                 105                 110

Leu Thr Met Val Phe Ser Lys Gln Ala Ala Arg Phe Phe Glu Ser Ala
        115                 120                 125

Glu Val Ile Glu Leu His His Pro Asn Lys Leu Asp Ala Pro Ser Gly
    130                 135                 140

Thr Ala Ile His Thr Ala Gln Gly Ile Ala Ala Ala Arg Lys Glu Ala
145                 150                 155                 160

Gly Met Asp Ala Gln Pro Asp Ala Thr Glu Gln Ala Leu Glu Gly Ser
                165                 170                 175

Arg Gly Ala Ser Val Asp Gly Ile Pro Val His Ala Val Arg Met Ser
            180                 185                 190

Gly Met Val Ala His Glu Gln Val Ile Phe Gly Thr Gln Gly Gln Thr
        195                 200                 205

Leu Thr Ile Lys Gln Asp Ser Tyr Asp Arg Asn Ser Phe Ala Pro Gly
    210                 215                 220

Val Leu Val Gly Val Arg Asn Ile Ala Gln His Pro Gly Leu Val Val
225                 230                 235                 240

Gly Leu Glu His Tyr Leu Gly Leu
                245

<210> SEQ ID NO 67
<211> LENGTH: 33
<212> TYPE: DNA
<213> ORGANISM: Artificial Sequence
<220> FEATURE:
<223> OTHER INFORMATION: primer

<400> SEQUENCE: 67
tcgagctcgg taccccgacg gggaacccaa cgg					33

<210> SEQ ID NO 68

<210> SEQ ID NO 68
<211> LENGTH: 32
<212> TYPE: DNA
<213> ORGANISM: Artificial Sequence
<220> FEATURE:
<223> OTHER INFORMATION: primer

<400> SEQUENCE: 68
gtttgaccaa cgttgccttt ggctccgaga ac                                    32

<210> SEQ ID NO 69
<211> LENGTH: 32
<212> TYPE: DNA
<213> ORGANISM: Artificial Sequence
<220> FEATURE:
<223> OTHER INFORMATION: primer

<400> SEQUENCE: 69
gagccaaagg caacgttggt caaactattg tg                                    32

<210> SEQ ID NO 70
<211> LENGTH: 32
<212> TYPE: DNA
<213> ORGANISM: Artificial Sequence
<220> FEATURE:
<223> OTHER INFORMATION: primer

<400> SEQUENCE: 70
ctctagagga tccccttgcg ccacgggaac cc                                    32

<210> SEQ ID NO 71
<211> LENGTH: 445
<212> TYPE: PRT
<213> ORGANISM: Unknown
<220> FEATURE:
<223> OTHER INFORMATION: modified LysA (diaminopimelate decarboxylase)

<400> SEQUENCE: 71

```
Met Ala Thr Val Glu Asn Phe Asn Glu Leu Pro Ala His Val Trp Pro
1               5                   10                  15

Arg Asn Ala Val Arg Gln Glu Asp Gly Val Val Thr Val Ala Gly Val
            20                  25                  30

Pro Leu Pro Asp Leu Ala Glu Glu Tyr Gly Thr Pro Leu Phe Val Val
        35                  40                  45

Asp Glu Asp Asp Phe Arg Ser Arg Cys Arg Asp Met Ala Thr Ala Phe
    50                  55                  60

Gly Gly Pro Gly Asn Val His Tyr Ala Ser Lys Ala Phe Leu Thr Lys
65                  70                  75                  80

Thr Ile Ala Arg Trp Val Asp Glu Glu Gly Leu Ala Leu Asp Ile Ala
                85                  90                  95

Ser Ile Asn Glu Leu Gly Ile Ala Leu Ala Ala Gly Phe Pro Ala Ser
            100                 105                 110

Arg Ile Thr Ala His Gly Asn Asn Lys Gly Val Glu Phe Leu Arg Ala
        115                 120                 125

Leu Val Gln Asn Gly Val Gly His Val Val Leu Asp Ser Ala Gln Glu
    130                 135                 140

Leu Glu Leu Leu Asp Tyr Val Ala Ala Gly Glu Gly Lys Ile Gln Asp
145                 150                 155                 160

Val Leu Ile Arg Val Lys Pro Gly Ile Glu Ala His Thr His Glu Phe
                165                 170                 175

Ile Ala Thr Ser His Glu Asp Gln Lys Phe Gly Phe Ser Leu Ala Ser
            180                 185                 190
```

Gly Ser Ala Phe Glu Ala Ala Lys Ala Ala Asn Asn Ala Glu Asn Leu
            195                 200                 205

Asn Leu Val Gly Leu His Cys His Val Gly Ser Gln Val Phe Asp Ala
210                 215                 220

Glu Gly Phe Lys Leu Ala Ala Glu Arg Val Leu Gly Leu Tyr Ser Gln
225                 230                 235                 240

Ile His Ser Glu Leu Gly Val Ala Leu Pro Glu Leu Asp Leu Gly Gly
                245                 250                 255

Gly Tyr Gly Ile Ala Tyr Thr Ala Ala Glu Pro Leu Asn Val Ala
            260                 265                 270

Glu Val Ala Ser Asp Leu Leu Thr Ala Val Gly Lys Met Ala Ala Glu
            275                 280                 285

Leu Gly Ile Asp Ala Pro Thr Val Leu Val Glu Pro Gly Arg Ala Ile
            290                 295                 300

Ala Gly Pro Ser Thr Val Thr Ile Tyr Glu Val Gly Thr Thr Lys Asp
305                 310                 315                 320

Val His Val Asp Asp Lys Thr Arg Arg Tyr Ile Ala Val Asp Gly
                325                 330                 335

Gly Met Ser Asp Asn Ile Arg Pro Ala Leu Tyr Gly Ser Glu Tyr Asp
                340                 345                 350

Ala Arg Val Val Ser Arg Phe Ala Glu Gly Asp Pro Val Ser Thr Arg
            355                 360                 365

Ile Val Gly Ser His Cys Glu Ser Gly Asp Ile Leu Ile Asn Asp Glu
            370                 375                 380

Ile Tyr Pro Ser Asp Ile Thr Ser Gly Asp Phe Leu Ala Leu Ala Ala
385                 390                 395                 400

Thr Gly Ala Tyr Cys Tyr Ala Ala Ser Ser Arg Tyr Asn Ala Phe Thr
                405                 410                 415

Arg Pro Ala Val Val Ser Val Arg Ala Gly Ser Ser Arg Leu Met Leu
            420                 425                 430

Arg Arg Glu Thr Leu Asp Asp Ile Leu Ser Leu Glu Ala
            435                 440                 445

<210> SEQ ID NO 72
<211> LENGTH: 34
<212> TYPE: DNA
<213> ORGANISM: Artificial Sequence
<220> FEATURE:
<223> OTHER INFORMATION: primer

<400> SEQUENCE: 72
tcgagctcgg tacccgttgg gcctgtactc acag                               34

<210> SEQ ID NO 73
<211> LENGTH: 32
<212> TYPE: DNA
<213> ORGANISM: Artificial Sequence
<220> FEATURE:
<223> OTHER INFORMATION: primer

<400> SEQUENCE: 73
tagcgggagc tcgcggcgta gcagtatgcg cc                                 32

<210> SEQ ID NO 74
<211> LENGTH: 32
<212> TYPE: DNA
<213> ORGANISM: Artificial Sequence
<220> FEATURE:

<223> OTHER INFORMATION: primer

<400> SEQUENCE: 74
tactgctacg ccgcgagctc ccgctacaac gc 32

<210> SEQ ID NO 75
<211> LENGTH: 33
<212> TYPE: DNA
<213> ORGANISM: Artificial Sequence
<220> FEATURE:
<223> OTHER INFORMATION: primer

<400> SEQUENCE: 75
ctctagagga tcccgtgcaa ggtgaaccaa ctg 33

<210> SEQ ID NO 76
<211> LENGTH: 301
<212> TYPE: PRT
<213> ORGANISM: Unknown
<220> FEATURE:
<223> OTHER INFORMATION: modified DapA (dihydrodipicolinate synthase)

<400> SEQUENCE: 76

```
Met Ser Thr Gly Leu Thr Ala Lys Thr Gly Val Glu His Phe Gly Thr
1               5                   10                  15

Val Gly Val Ala Met Val Thr Pro Phe Thr Glu Ser Gly Asp Ile Asp
            20                  25                  30

Ile Ala Ala Gly Arg Glu Val Ala Ala Tyr Leu Val Asp Lys Gly Leu
        35                  40                  45

Asp Ser Leu Val Leu Ala Gly Thr Thr Gly Glu Ser Pro Thr Thr Thr
    50                  55                  60

Ala Ala Glu Lys Leu Glu Leu Leu Lys Ala Val Arg Glu Glu Val Gly
65                  70                  75                  80

Asp Arg Ala Lys Leu Ile Ala Gly Val Gly Thr Asn Asn Thr Arg Thr
                85                  90                  95

Ser Val Glu Leu Ala Glu Ala Ala Ser Ala Gly Ala Asp Gly Leu
            100                 105                 110

Leu Val Val Thr Pro Tyr Phe Ser Lys Pro Ser Gln Glu Gly Leu Leu
        115                 120                 125

Ala His Phe Gly Ala Ile Ala Ala Thr Glu Val Pro Ile Cys Leu
    130                 135                 140

Tyr Asp Ile Pro Gly Arg Ser Gly Ile Pro Ile Glu Ser Asp Thr Met
145                 150                 155                 160

Arg Arg Leu Ser Glu Leu Pro Thr Ile Leu Ala Val Lys Asp Ala Lys
                165                 170                 175

Gly Asp Leu Val Ala Ala Thr Ser Leu Ile Lys Glu Thr Gly Leu Ala
            180                 185                 190

Trp Tyr Ser Gly Asp Asp Pro Leu Asn Leu Val Trp Leu Ala Leu Gly
        195                 200                 205

Gly Ser Gly Phe Ile Ser Val Ile Gly His Ala Ala Pro Thr Ala Leu
    210                 215                 220

Arg Glu Leu Tyr Thr Ser Phe Glu Glu Gly Asp Leu Val Arg Ala Arg
225                 230                 235                 240

Glu Ile Asn Ala Lys Leu Ser Pro Leu Val Ala Ala Gln Gly Arg Leu
                245                 250                 255

Gly Gly Val Ser Leu Ala Lys Ala Ala Leu Arg Leu Gln Gly Ile Asn
            260                 265                 270
```

Val Gly Asp Pro Arg Leu Pro Ile Met Ala Pro Asn Glu Gln Glu Leu
        275                 280                 285

Glu Ala Leu Arg Glu Asp Met Lys Lys Ala Gly Val Leu
        290                 295                 300

<210> SEQ ID NO 77
<211> LENGTH: 34
<212> TYPE: DNA
<213> ORGANISM: Artificial Sequence
<220> FEATURE:
<223> OTHER INFORMATION: primer

<400> SEQUENCE: 77
tcgagctcgg taccctttcat atagttaaga caac                              34

<210> SEQ ID NO 78
<211> LENGTH: 33
<212> TYPE: DNA
<213> ORGANISM: Artificial Sequence
<220> FEATURE:
<223> OTHER INFORMATION: primer

<400> SEQUENCE: 78
cggcttggag aaataaggag ttacaactaa aag                                33

<210> SEQ ID NO 79
<211> LENGTH: 32
<212> TYPE: DNA
<213> ORGANISM: Artificial Sequence
<220> FEATURE:
<223> OTHER INFORMATION: primer

<400> SEQUENCE: 79
taactcctta tttctccaag ccgagccaag ag                                 32

<210> SEQ ID NO 80
<211> LENGTH: 33
<212> TYPE: DNA
<213> ORGANISM: Artificial Sequence
<220> FEATURE:
<223> OTHER INFORMATION: primer

<400> SEQUENCE: 80
ctctagagga tcccgagcct caagttcctg ctc                                33

<210> SEQ ID NO 81
<211> LENGTH: 248
<212> TYPE: PRT
<213> ORGANISM: Unknown
<220> FEATURE:
<223> OTHER INFORMATION: DapB (dihydrodipicolinate reductase)

<400> SEQUENCE: 81

Met Gly Ile Lys Val Gly Val Leu Gly Ala Lys Gly Arg Val Gly Gln
1               5                   10                  15

Thr Ile Val Ala Ala Val Asn Glu Ser Asp Asp Leu Glu Leu Val Ala
            20                  25                  30

Glu Ile Gly Val Asp Asp Asp Leu Ser Leu Leu Val Asp Asn Gly Ala
        35                  40                  45

Glu Val Val Val Asp Phe Thr Thr Pro Asn Ala Val Met Gly Asn Leu
    50                  55                  60

Glu Phe Cys Ile Asn Asn Gly Ile Ser Ala Val Val Gly Thr Thr Gly
65                  70                  75                  80

-continued

```
Phe Asp Asp Ala Arg Leu Glu Gln Val Arg Asp Trp Leu Glu Gly Lys
                85                  90                  95
Asp Asn Val Gly Val Leu Ile Ala Pro Asn Phe Ala Ile Ser Ala Val
            100                 105                 110
Leu Thr Met Val Phe Ser Lys Gln Ala Ala Arg Phe Phe Glu Ser Ala
        115                 120                 125
Glu Val Ile Glu Leu His His Pro Asn Lys Leu Asp Ala Pro Ser Gly
    130                 135                 140
Thr Ala Ile His Thr Ala Gln Gly Ile Ala Ala Ala Arg Lys Glu Ala
145                 150                 155                 160
Gly Met Asp Ala Gln Pro Asp Ala Thr Glu Gln Ala Leu Glu Gly Ser
                165                 170                 175
Arg Gly Ala Ser Val Asp Gly Ile Pro Val His Ala Val Arg Met Ser
            180                 185                 190
Gly Met Val Ala His Glu Gln Val Ile Phe Gly Thr Gln Gly Gln Thr
        195                 200                 205
Leu Thr Ile Lys Gln Asp Ser Tyr Asp Arg Asn Ser Phe Ala Pro Gly
    210                 215                 220
Val Leu Val Gly Val Arg Asn Ile Ala Gln His Pro Gly Leu Val Val
225                 230                 235                 240
Gly Leu Glu His Tyr Leu Gly Leu
                245
```

<210> SEQ ID NO 82
<211> LENGTH: 445
<212> TYPE: PRT
<213> ORGANISM: Unknown
<220> FEATURE:
<223> OTHER INFORMATION: LysA (diaminopimelate decarboxylase)

<400> SEQUENCE: 82

```
Met Ala Thr Val Glu Asn Phe Asn Glu Leu Pro Ala His Val Trp Pro
1               5                   10                  15
Arg Asn Ala Val Arg Gln Glu Asp Gly Val Val Thr Val Ala Gly Val
                20                  25                  30
Pro Leu Pro Asp Leu Ala Glu Glu Tyr Gly Thr Pro Leu Phe Val Val
            35                  40                  45
Asp Glu Asp Asp Phe Arg Ser Arg Cys Arg Asp Met Ala Thr Ala Phe
        50                  55                  60
Gly Gly Pro Gly Asn Val His Tyr Ala Ser Lys Ala Phe Leu Thr Lys
65                  70                  75                  80
Thr Ile Ala Arg Trp Val Asp Glu Glu Gly Leu Ala Leu Asp Ile Ala
                85                  90                  95
Ser Ile Asn Glu Leu Gly Ile Ala Leu Ala Ala Gly Phe Pro Ala Ser
            100                 105                 110
Arg Ile Thr Ala His Gly Asn Asn Lys Gly Val Glu Phe Leu Arg Ala
        115                 120                 125
Leu Val Gln Asn Gly Val Gly His Val Val Leu Asp Ser Ala Gln Glu
    130                 135                 140
Leu Glu Leu Leu Asp Tyr Val Ala Ala Gly Glu Gly Lys Ile Gln Asp
145                 150                 155                 160
Val Leu Ile Arg Val Lys Pro Gly Ile Glu Ala His Thr His Glu Phe
                165                 170                 175
Ile Ala Thr Ser His Glu Asp Gln Lys Phe Gly Phe Ser Leu Ala Ser
            180                 185                 190
```

Gly Ser Ala Phe Glu Ala Ala Lys Ala Ala Asn Asn Ala Glu Asn Leu
            195                 200                 205

Asn Leu Val Gly Leu His Cys His Val Gly Ser Gln Val Phe Asp Ala
    210                 215                 220

Glu Gly Phe Lys Leu Ala Ala Glu Arg Val Leu Gly Leu Tyr Ser Gln
225                 230                 235                 240

Ile His Ser Glu Leu Gly Val Ala Leu Pro Glu Leu Asp Leu Gly Gly
                245                 250                 255

Gly Tyr Gly Ile Ala Tyr Thr Ala Ala Glu Glu Pro Leu Asn Val Ala
            260                 265                 270

Glu Val Ala Ser Asp Leu Leu Thr Ala Val Gly Lys Met Ala Ala Glu
    275                 280                 285

Leu Gly Ile Asp Ala Pro Thr Val Leu Val Glu Pro Gly Arg Ala Ile
290                 295                 300

Ala Gly Pro Ser Thr Val Thr Ile Tyr Glu Val Gly Thr Thr Lys Asp
305                 310                 315                 320

Val His Val Asp Asp Lys Thr Arg Arg Tyr Ile Ala Val Asp Gly
                325                 330                 335

Gly Met Ser Asp Asn Ile Arg Pro Ala Leu Tyr Gly Ser Glu Tyr Asp
            340                 345                 350

Ala Arg Val Val Ser Arg Phe Ala Glu Gly Asp Pro Val Ser Thr Arg
    355                 360                 365

Ile Val Gly Ser His Cys Glu Ser Gly Asp Ile Leu Ile Asn Asp Glu
370                 375                 380

Ile Tyr Pro Ser Asp Ile Thr Ser Gly Asp Phe Leu Ala Leu Ala Ala
385                 390                 395                 400

Thr Gly Ala Tyr Cys Tyr Ala Met Ser Ser Arg Tyr Asn Ala Phe Thr
                405                 410                 415

Arg Pro Ala Val Val Ser Val Arg Ala Gly Ser Ser Arg Leu Met Leu
            420                 425                 430

Arg Arg Glu Thr Leu Asp Asp Ile Leu Ser Leu Glu Ala
    435                 440                 445

<210> SEQ ID NO 83
<211> LENGTH: 300
<212> TYPE: PRT
<213> ORGANISM: Unknown
<220> FEATURE:
<223> OTHER INFORMATION: DapA (dihydrodipicolinate synthase)

<400> SEQUENCE: 83

Met Ser Thr Gly Leu Thr Ala Lys Thr Gly Val Glu His Phe Gly Thr
1               5                   10                  15

Val Gly Val Ala Met Val Thr Pro Phe Thr Glu Ser Gly Asp Ile Asp
            20                  25                  30

Ile Ala Ala Gly Arg Glu Val Ala Ala Tyr Leu Val Asp Lys Gly Leu
        35                  40                  45

Asp Ser Leu Val Leu Ala Gly Thr Thr Gly Glu Ser Pro Thr Thr Thr
    50                  55                  60

Ala Ala Glu Lys Leu Glu Leu Leu Lys Ala Val Arg Glu Glu Val Gly
65                  70                  75                  80

Asp Arg Ala Lys Leu Ile Ala Gly Val Gly Thr Asn Asn Thr Arg Thr
                85                  90                  95

Ser Val Glu Leu Ala Glu Ala Ala Ser Ala Gly Ala Asp Gly Leu
            100                 105                 110

-continued

```
Leu Val Val Thr Pro Tyr Tyr Ser Lys Pro Ser Gln Glu Gly Leu Leu
        115                 120             125

Ala His Phe Gly Ala Ile Ala Ala Thr Glu Val Pro Ile Cys Leu
    130             135             140

Tyr Asp Ile Pro Gly Arg Ser Gly Ile Pro Ile Glu Ser Asp Thr Met
145             150             155             160

Arg Arg Leu Ser Glu Leu Pro Thr Ile Leu Ala Val Lys Asp Ala Lys
                165             170             175

Gly Asp Leu Val Ala Ala Thr Ser Leu Ile Lys Glu Thr Gly Leu Ala
            180             185             190

Trp Tyr Ser Gly Asp Asp Pro Leu Asn Leu Val Trp Leu Ala Leu Gly
        195             200             205

Gly Ser Gly Phe Ile Ser Val Ile Gly His Ala Ala Pro Thr Ala Leu
    210             215             220

Arg Glu Leu Tyr Thr Ser Phe Glu Glu Gly Asp Leu Val Arg Ala Arg
225             230             235             240

Glu Ile Asn Ala Lys Leu Ser Pro Leu Val Ala Ala Gln Gly Arg Leu
            245             250             255

Gly Gly Val Ser Leu Ala Lys Ala Ala Leu Arg Leu Gln Gly Ile Asn
            260             265             270

Val Gly Asp Pro Arg Leu Pro Ile Met Ala Pro Asn Glu Gln Glu Leu
        275             280             285

Glu Ala Leu Arg Glu Asp Met Lys Lys Ala Gly Val
        290             295             300
```

MODIFIED POLYPEPTIDE OF MESO-DIAMINOPIMELATE DEHYDROGENASE AND POLYNUCLEOTIDE ENCODING THE MODIFIED POLYPEPTIDE

CROSS-REFERENCE TO RELATED APPLICATIONS

The present application is a 35 U.S.C. § 371 national-phase filing of International Application No. PCT/KR2020/010738, filed on Aug. 13, 2020, which claims the benefit of Korean Patent Application No. 10-2019-0119058, filed on Sep. 26, 2019, both of which applications are incorporated herein by reference in their entirety.

INCORPORATION BY REFERENCE

This application contains a sequence listing entitled "059520_00027_ST25.txt," being submitted herein in ASCII format via EFS-Web, which is a copy of the sequence listing as filed in PCT/KR2020/010738, was modified on Nov. 29, 2021 and is 46,990 bytes in size.

TECHNICAL FIELD

The present disclosure relates to a modified polypeptide in which the activity of meso-diaminopimelate dehydrogenase is weakened, and a method for producing L-threonine using the same.

BACKGROUND ART

A microorganism of the genus *Corynebacterium*, particularly *Corynebacterium glutamicum*, is a gram-positive microorganism which is widely used in the production of L-amino acids and other useful materials. In order to produce the L.-amino acids and other useful materials, various studies are being conducted for the development of a fermentation process technology and microorganisms capable of high efficiency production of these materials. For example, target material-specific approaches (e.g., a method for increasing the expression of a gene encoding an enzyme involved in L-lysine biosynthesis, a method for removing a gene unnecessary for L-lysine biosynthesis, etc.) are mainly used (U.S. Pat. No. 8,048,650).

Meanwhile, among the L-amino acids, L-lysine, L-threonine, L-methionine, L-isoleucine, and L-glycine are amino acids derived from aspartate, and the synthesis level of oxaloacetate (i.e., a precursor of aspartate) can affect the synthesis levels of these L-amino acids.

Meso-diaminopimelate dehydrogenase is an important enzyme which converts piperodeine 2,6-dicarboxylate, that is produced during lysine production in a microorganism, to meso-2,6-diaminopimelate, and fixes a nitrogen source in the lysine production pathway.

The details with respect to the changes in the phenotype of a strain producing L-threonine due to the deletion of the ddh gene (i.e., a gene encoding meso-diaminopimelate dehydrogenase) and the lysE gene (i.e., an L-lysine exporter gene) are reported in prior literature (X Dong, Y Zhao, J Hu, Y Li, X Wang—*Enzyme and microbial technology*, 2016). However, since the deletion of the lysE gene bas a negative effect of delaying the growth rate of the strain and reducing the amount of threonine production, and since the deletion of the ddh gene inhibits the growth of the strain, there is still a need for conducting studies focused on both the increase of the ability of effective production of L-amino acids and the growth of the strain.

DISCLOSURE

Technical Problem

The present inventors have made extensive efforts to increase the production of L-threonine while decreasing the production of L-lysine without delaying the growth rate of a strain. As a result, they have discovered that when a novel modified polypeptide in which the activity of meso-diaminopimelate dehydrogenase is weakened to a certain level is used, not only it is possible to maintain the growth of a microorganism, but also it is possible to increase the amount of L.-threonine production, thereby completing the present disclosure.

Technical Solution

An object of the present disclosure is to provide a modified polypeptide of meso-diaminopimelate dehydrogenase derived from *Corynebacterium glutamicum*.

Another object of the present disclosure is to provide a polynucleotide which encodes the modified polypeptide.

Still another object of the present disclosure is to provide a microorganism of the genus *Corynebacterium*, which comprises the modified polypeptide of meso-diaminopimelate dehydrogenase or a polynucleotide that encodes the same.

Still another object of the present disclosure is to provide a method for producing L-threonine comprising a step of culturing the microorganism in a medium.

Still another object of the present disclosure is to provide a use of the microorganism for the production of L-threonine.

Advantageous Effects

When the novel modified polypeptide of the present disclosure, in which the activity of meso-diaminopimelate dehydrogenase is weakened, is used, it is possible to further enhance the amount of L-threonine production. In this respect, the effects of high yield and convenience can be expected from the industrial aspect.

BEST MODE FOR CARRYING OUT THE INVENTION

The present disclosure is described in detail as follows. Meanwhile, respective descriptions and embodiments disclosed in the present disclosure may also be applied to other descriptions and embodiments. That is, all combinations of various elements disclosed in the present disclosure fall within the scope of the present disclosure. Further, the scope of the present disclosure cannot be considered to be limited by the specific description below.

To achieve the above objects, an aspect of the present disclosure provides a modified polypeptide of meso-diaminopimelate dehydrogenase derived from *Corynebacterium glutamicum*.

Specifically, the present disclosure provides a modified polypeptide of meso-diaminopimelate dehydrogenase, in which the 169$^{th}$ amino acid in the amino acid sequence of SEQ ID NO: 1 is substituted with a different amino acid, and more specifically provides a modified polypeptide of meso-diaminopimelate dehydrogenase, in which the 169$^{th}$ amino acid in the amino acid sequence of SEQ ID NO: 1 is substituted with leucine, phenylalanine, glutamate, or cysteine.

As used herein, the term "meso-diaminopimelate dehydrogenase" refers to NADPH-dependent reductase that catalyzes the intermediate process for lysine biosynthesis. The meso-diaminopimelate dehydrogenase is an important enzyme which converts piperodeine 2,6-dicarboxylate, that is produced during lysine production process in a microorganism, to produce meso-2,6-diaminopimelate, and fixes a nitrogen source in the lysine production pathway. Specifically, the meso-diaminopimelate dehydrogenase is a meso-2,6-diaminopimelate synthase, and it has a role of regulating the rate in the third step of the lysine production pathway. Additionally, the enzyme catalyzes the reaction of fixing an ammonia group into piperodiene 2,6-dicarbosylate and thereby forms meso-2,6-diaminopimelate.

In the present disclosure, the term "meso-diaminopimelate dehydrogenase" can be used interchangeably with citrate synthase, meso-diaminopimelate dehydrogenase, and DDH.

In the present disclosure, the sequence of meso-diaminopimelate dehydrogenase may be obtained from the NCBI's GenBank, which is a public database. For example, the sequence of meso-diaminopimelate dehydrogenase may be that of a meso-diaminopimelate dehydrogenase derived from *Corynebacterium* sp., and more specifically, a polypeptide protein comprising the amino acid sequence of SEQ ID NO: 1, but the sequence of meso-diaminopimelate dehydrogenase is not limited thereto. Additionally, any sequence having the same activity as that of the above amino acid sequence may be included without limitation. Additionally, the amino acid sequence of meso-diaminopimelate dehydrogenase may include the amino acid sequence of SEQ ID NO: 1 or any amino acid sequence having a homology or identity of 80% or more to the amino acid sequence of SEQ ID NO: 1, but the amino acid sequence is not limited thereto. Specifically, the amino acid sequence may include the amino acid sequence of SEQ ID NO: 1 and any amino acid sequence having a homology or identity of at least 80%, 85%, 90%, 95%, 96%, 97%, 98%, or 99% or more to the amino acid sequence of SEQ ID NO: 1. Additionally, it is apparent that any protein having an amino acid sequence, in which part of the amino acid sequence is deleted, modified, substituted, or added, may also be included within the scope of the present disclosure as long as the amino acid sequence has such a homology or identity of an amino acid sequence to that of the above protein and exhibits an effect corresponding to that of the above protein.

As used herein, the term "variant" refers to a polypeptide, in which at least one amino acid in the conservative substitution and/or modification is different from that of the recited sequence, but the functions or properties of the protein are maintained. A variant differs from the sequence identified by several amino acid substitutions, deletions, or additions. Generally, such a variant can be identified by modifying one amino acid in the amino acid sequence of the polypeptide above and by evaluating the properties of the modified polypeptide above. That is, the ability of a variant may be increased, unchanged, or reduced compared to that of its native protein. Additionally, some variants may include those in which one or more parts (e.g., an N-terminal leader sequence or a transmembrane domain) are removed.

As used herein, the term "conservative substitution" refers to a substitution of one amino acid with a different amino acid that has similar structural and/or chemical properties. The variant may have, for example, one or more conservative substitutions while still retaining one or more biological activities. Such amino acid substitutions may generally occur based on similarity in polarity, charge, solubility, hydrophobicity, hydrophilicity, and/or amphipathic nature of residues. For example, positively-charged (basic) amino acids include arginine, lysine, and histidine; negatively-charged (acidic) amino acids include glutamic acid and aspartic acid; aromatic amino acids include phenylalanine, tryptophan, and tyrosine; hydrophobic amino acids include alanine, valine, isoleucine, leucine, methionine, phenylalanine, proline, glycine, and tryptophan. Typically, conservative substitution has little or no effect on the activity of the polypeptide generated.

Additionally, a variant may include deletion or addition of amino acids that have a minimal influence on properties and a secondary structure of a polypeptide. For example, a polypeptide may be conjugated to a signal (or leader) sequence at the N-terminus of a protein, which co-translationally or post-translationally directs transfer of the protein. In addition, the polypeptide may also be conjugated to another sequence or a linker for identification, purification, or synthesis of the polypeptide.

As used herein, the term "modified polypeptide of meso-diaminopimelate dehydrogenase" refers to a modified polypeptide of meso-diaminopimelate dehydrogenase, which includes one or more amino acid substitutions in the amino acid sequence of a polypeptide that has an activity of a meso-diaminopimelate dehydrogenase protein, and the amino acid substitutions include a substitution in which the 169$^{th}$ amino acid from the N-terminus is substituted with a different amino acid.

Specifically, the modified polypeptide includes a modified polypeptide, in which the amino acid corresponding to the 169$^{th}$ amino acid in the amino acid sequence of the polypeptide that has an activity of a meso-diaminopimelate dehydrogenase protein is substituted with a different amino acid. For example, the modified polypeptide includes a modified polypeptide, in which a mutation has occurred on the amino acid at the 169$^{th}$ position from the N-terminus in the amino acid sequence of SEQ ID NO: 1. More specifically, the modified polypeptide may be a protein, in which the amino acid corresponding to the 169$^{th}$ amino acid of SEQ ID NO: 1 is substituted with a different amino acid.

The term "substitution with a different amino acid" is not limited as long as the amino acid is substituted with an amino acid which is different from that before the substitution. Specifically, the substitution may be one in which the amino acid is substituted with any one amino acid selected from the group consisting of L-lysine, L-histidine. L-glutamate, L-aspartic acid, L-glycine, L-alanine, L-valine, L-leucine, L-isoleucine, L-methionine, L-phenylalanine, L-tryptophan, L-proline, L-serine, L-cysteine, L-tyrosine, L-asparagine, and L-glutamine. More specifically, the modified polypeptide may be one in which the 169$^{th}$ amino acid in the amino acid sequence of SEQ ID NO: 1 is any one selected from the group consisting of L-leucine, L-phenylalanine, L-glutamate, and L-cysteine, but the modified polypeptide is not limited thereto.

Additionally, the substituted amino acid residue may include not only natural amino acids but also non-natural amino acids. The non-natural amino acids may be, for example, D-amino acids, homo-amino acids, beta-homo-amino acids, N-methyl amino acids, alpha-methyl amino acids, uncommon amino acids (e.g., citrulline, naphthyl alanine, etc.), but the non-natural amino acids are not limited thereto.

Meanwhile, when it is expressed that "a specific amino acid is substituted" in the present disclosure, it is apparent that the amino acid is substituted with an amino acid different from the amino acid before the substitution, even if it is not separately indicated that it is substituted with a different amino acid.

As used herein, the term "corresponding to" refers to an amino acid residue which is at the position recited in a protein or peptide, or an amino acid residue which is identical or corresponding to the residue recited in a protein or peptide. As used herein, the term "corresponding region" generally refers to a similar position in a related protein or reference protein.

In the present disclosure, specific numbering may be used for amino acid residue positions in the polypeptide used in the present disclosure. For example, it is possible to renumber the positions corresponding to the amino acid residue positions of the polypeptide of the present disclosure by aligning the subject polypeptide to be compared with the polypeptide sequence of the present disclosure.

The variant of the meso-diaminopimelate dehydrogenase provided in the present disclosure is such that the amino acid at a specific position in the meso-diaminopimelate dehydrogenase described above is substituted, and thus the ability of producing L-threonine can be increased compared to the polypeptide before the modification.

The modified polypeptide may be one, in which the $169^{th}$ amino acid from the N-terminus in the amino acid sequence of SEQ ID NO: 1 described above and/or an amino acid sequence, which has a homology or identity of at least 80%, 85%, 90%, 95%, 96%, 97%, 98%, or 99% or more to the amino acid sequence of SEQ ID NO: 1 is modified.

Additionally, the modified polypeptide may be one, in which the $169^{th}$ amino acid from the N-terminus in the amino acid sequence of SEQ ID NO: 1 described above and/or an amino acid sequence which has a homology or identity of at least 80%, 85%, 90%, 95%, 96%, 97%, 98%, or 99% or more to the amino acid sequence of SEQ ID NO: 1 is modified; which has a sequence homology of at least 80%, 90%, 95%, 96%, 97%, 98%, 99% or more, and less than 100% to the amino acid sequence of SEQ ID NO: 1; and which has an activity of meso-diaminopimelate dehydrogenase, The activity of meso-diaminopimelate dehydrogenase of the modified polypeptide may be weaker than that of the meso-diaminopimelate dehydrogenase having the amino acid sequence of SEQ ID NO: 1, which is the wild-type.

For the purpose of the present disclosure, the microorganism comprising the modified polypeptide of meso-diaminopimelate dehydrogenase is characterized in that the amount of L-amino acids production is increased compared to a microorganism where the modified polypeptide of meso-diaminopimelate dehydrogenase is not present. The modified polypeptide of meso-diaminopimelate dehydrogenase is characterized in that it has a gene control activity so as to increase the ability of producing an L-amino acid compared to the natural wild-type or non-modified meso-diaminopimelate dehydrogenase. It has a significant meaning that the amount of L-amino acid production can be increased through a microorganism, into which the modified polypeptide of meso-diaminopimelate dehydrogenase is introduced. Specifically, the L-amino acid may be L-threonine or an amino acid derived from L-threonine, but any L-amino acid, which can be produced by the introduction of the modified polypeptide of meso-diaminopimelate dehydrogenase or by including the modified polypeptide of meso-diaminopimelate dehydrogenase, can be included without limitation.

The amino acid derived from L-threonine refers to an amino acid which can be biosynthesized using L-threonine as a precursor, and the amino acid derived from L-threonine is not limited as long as it can be biosynthesized from L-threonine.

The modified polypeptide of meso-diaminopimelate dehydrogenase may be, for example, a modified polypeptide which includes an amino acid sequence, in which the amino acid corresponding to the $169^{th}$ amino acid in the amino acid sequence of SEQ ID NO: 1 is substituted with a different amino acid, and it may be one consisting of the amino acid sequence of SEQ ID NO: 3. The variant, in which the amino acid corresponding to the $169^{th}$ amino acid in the amino acid sequence of SEQ ID NO: 1 is substituted with leucine, may be one consisting of the amino acid sequence of SEQ ID NO: 3, but the variant is not limited thereto. Additionally, the modified polypeptide of meso-diaminopimelate dehydrogenase may include the amino acid sequence of SEQ ID NO: 3 or an amino acid sequence, which has a homology or identity of 80% or higher to the amino acid sequence of SEQ ID NO: 3, but the modified polypeptide of meso-diaminopimelate dehydrogenase is not limited thereto. Specifically, the modified polypeptide of meso-diaminopimelate dehydrogenase of the present disclosure may include a protein having the amino acid sequence of SEQ ID NO: 3 or a protein, which has a homology or identity of at least 80%, 85%, 90%, 95%, 96%, 97%, 98%, or 99% or more to the amino acid sequence of SEQ ID NO: 3. Additionally, it is apparent that any protein having an amino acid sequence with deletion, modification, substitution, or addition in some amino acids thereof can also belong to the scope of the present disclosure in addition to the amino acid corresponding to the $169^{th}$ amino acid of SEQ ID NO: 1, as long as the protein has an amino acid sequence with such homologies or identities and exhibits an effect corresponding to the above protein.

That is, even if it is described herein as a "protein having an amino acid sequence of a specific SEQ ID NO", it is apparent that a protein having an amino acid sequence with deletion, modification, substitution, conservatively substitution, or addition in part of the sequence can also be used in the present disclosure as long as the protein has the effect identical or corresponding to that of the protein consisting of the amino acid sequence of the corresponding SEQ ID NO. For example, as long as the protein has an activity identical or corresponding to that of the modified protein, an addition of a sequence that does not alter the function of the protein upstream or downstream of the amino acid sequence, naturally-occurring mutations, silent mutations, or conservative substitutions thereof are not excluded. It is apparent that even if the protein has such a sequence addition or mutation, it falls within the scope of the present disclosure.

As used herein, the term "homology" or "identity" refers to a degree of relevance between two given amino acid sequences or nucleotide sequences, and it may be expressed as a percentage.

These terms "homology" and "identity" may often be used interchangeably.

A sequence homology or identity of conserved polynucleotides or polypeptides can be determined by standard alignment algorithm, and default gap penalties established by a program being used may be used together. Actually, homologous or identical sequences may hybridize with each other along the entire length or at least about 50%, 60%, 70%, 80%, or 90% or more of the entire sequence under moderate or highly stringent conditions. In hybridization, polynucleotides including a degenerate codon instead of a codon are also considered.

Whether any two polynucleotide- or polypeptide sequences have a homology, similarity, or identity can be determined using computer algorithms known in the art, e.g., "FASTA" program using default parameters introduced by Pearson et al. (1988) [*Proc. Natl. Acad. Sci. USA* 85:2444]. Alternatively, Needleman-Wunsch algorithm (1970, *J. Mol. Biol.* 48:443-453) performed in a Needleman program of The European Molecular Biology Open Software Suite of EMBOSS package (Rice et al., 2000, *Trends Genet.* 16:276-277) (version 5.0.0 or a later version) may be used to determine the same (including GCG program package (Devereux, J., et al., *Nucleic Acids Research* 12:387 (1984)), BLASTP®, BLAST® N, FASTA (Atschul, [S.] [F.,] [ET AL., *J MOLEC BIOL* 215]: 403 (1990); Guide to Huge Computers, Martin J. Bishop, [ED.,] Academic Press, San Diego, 1994, and [CARILLO ETA/.] (1988) SIAM *J Applied Math* 48:1073). For example, the homology, similarity, or identity can be determined using BLAST® from the National Center for Biotechnology Information database or ClustalW.

The homology, similarity, or identity between polynucleotides or polypeptides may be determined, for example, by comparing the given sequence information using a GAP computer program, such as a program introduced by Needleman et al. (*J Mol Biol.* 48:443 (1970)), as disclosed by Smith and Waterman (*Adv. Appl. Math* (1981) 2:482). In brief, the GAP program defines a homology, similarity, or identity as the number of similar aligned symbols (i.e., nucleotides or amino acids) divided by the total number of the symbols in a shorter of the two sequences. The default parameters for the GAP program may include: (1) a unary comparison matrix (including a value 1 for identity and a value 0) for non-identity) and the weighted comparison matrix of Gribskov, et al., (*Nucl. Acids Rex.* 14:6745 (1986)) as described by Schwartz and Dayhoff, eds. (Atlas Of Protein Sequence And Structure, National Biomedical Research Foundation, pp. 353-358 (1979) or EDNAFULL (EMBOSS version of NCBI NUC4.4) substitution matrix); (2) a penalty of 3.0 for each gap and an additional 0.10 penalty for each symbol in each gap (or a gap open penalty of 10 and a gap extension penalty of 0.5); and (3) no penalty for end gaps. Therefore, as used herein, the term "homology" or "identity" represents relevance between sequences.

Still another aspect of the present disclosure provides a polynucleotide, which encodes the modified polypeptide of meso-diaminopimelate dehydrogenase.

As used herein, the term "polynucleotide" refers to a DNA or RNA strand having more than a certain length as a nucleotide polymer, which is a long chain of nucleotide monomers connected by a covalent bond, and more specifically refers to a polynucleotide fragment encoding the modified protein described above.

The polynucleotide, which encodes the modified polypeptide of meso-diaminopimelate dehydrogenase of the present disclosure, may include any polynucleotide sequence that encodes the modified polypeptide of meso-diaminopimelate dehydrogenase of the present disclosure without limitation. The polynucleotide, which encodes the modified polypeptide of meso-diaminopimelate dehydrogenase of the present disclosure, may include without limitation any polynucleotide sequence that encodes a modified protein, in which the 169$^{th}$ amino acid in the amino acid sequence of SEQ ID NO: 1 is substituted with a different amino acid. Specifically, the polynucleotide may include a polynucleotide sequence that encodes a variant, in which the 169$^{th}$ amino acid in the amino acid sequence of SEQ ID NO: 1 is substituted with leucine. For example, the polynucleotide encoding the modified polypeptide of meso-diaminopimelate dehydrogenase of the present disclosure may be a polynucleotide sequence encoding the amino acid sequence of SEQ ID NO: 3, but the polynucleotide is not limited thereto. More specifically, the polynucleotide may be one which consists of a polynucleotide sequence consisting of SEQ ID NO: 4, but the polynucleotide is not limited thereto. Considering codon degeneracy and the codons preferred in a bioorganism where the protein is to be expressed, various modifications may be performed in the coding region of the polynucleotide within the scope not altering the amino acid sequence of the protein. Accordingly, it is apparent that any polynucleotide, which can be translated into a polypeptide consisting of the amino acid sequence of SEQ ID NO: 3 or into a polypeptide having a homology or identity to the amino acid sequence of SEQ ID NO: 3, can also be included in the present disclosure.

Additionally, any sequence which encodes a modified polypeptide of meso-diaminopimelate dehydrogenase, in which the 169$^{th}$ amino acid in the amino acid sequence of SEQ ID NO: 1 is substituted with a different amino acid, by hybridizing with any probe that can be prepared from known gene sequences (e.g., complementary sequences to all or part of the above nucleotide sequence) under stringent conditions can be included without limitation.

The term "stringent conditions" refers to conditions which enables specific hybridization between polynucleotides. Such conditions are specifically described in references (e.g., J Sambrook et al., supra). For example, the stringent conditions may include conditions under which genes having a high homology or identity (e.g., 80% or more, 85% or more, specifically 90% or more, more specifically 95% or more, even more specifically 97% or more, and even more specifically 99% or more) are hybridized with each other, whereas genes having a lower homology or identity thereof are not hybridized with each other; or conventional washing conditions for southern hybridization (i.e., conditions for washing once, and specifically two or three times under a salt concentration and a temperature corresponding to 60° C., 1×SSC, and 0.1% SDS: specifically 60° C., 0.1×SSC, and 0.1% SDS; and more specifically 68° C., 0.1×SSC, and 0.1% SDS).

Although a mismatch between nucleotides may occur due to the stringency of hybridization, it is required that the two nucleic acids have a complementary sequence. The term "complementary" is used to describe the relationship between nucleotide bases which can hybridize with each other. For example, with respect to DNA, adenosine is complementary to thymine and cytosine is complementary to guanine. Accordingly, the present disclosure may include not only the substantially similar nucleic acid sequences, but also isolated nucleic acid fragments which are complementary to the entire sequence.

Specifically, the polynucleotide having a homology or identity may be detected using hybridization conditions including the hybridization step at a Tm value of 55° C. and the conditions described above. Additionally, the Tm value may be 60° C., 63° C., or 65° C., but is not limited thereto, and may be appropriately adjusted by one of ordinary skill in the art according to the purpose.

Appropriate stringency for the hybridization of polynucleotides depends on the length and degree of complementarity of the polynucleotides, and the variables are well known in the art (see Sambrook et al., supra, 9.50-9.51 and 11.7-11.8).

As used herein, the term "vector" refers to a DNA construct that includes a nucleotide sequence of a polynucleotide encoding a target modified protein operably linked to an appropriate control sequence to enable expression of the target modified protein in an appropriate host cell. The control sequence may include a promoter capable of initiating transcription, any operator sequence for the control of such transcription, a sequence encoding an appropriate mRNA ribosome-binding domain, and a sequence controlling termination of transcription and translation. After the vector is transformed into the appropriate host cell, it may replicate or function independently of the host genome, and may be integrated into the genome itself.

The vector used in the present disclosure is not particularly limited, as long as it is able to replicate in the host cell, and any vector known in the art may be used. Examples of commonly used vectors may include a natural or recombinant plasmid, cosmid, virus, and bacteriophage. For example, pWE15, M13, MBL3, MBL4, IXII, ASHII, APII, t10, t11, Charon4A, Charon21A, etc. may be used as a phage vector or cosmid vector; and those based on pBR, pUC, pBluescript® II, pGEM®, pTZ, pCL, pET, etc. may be used as a plasmid vector. Specifically, vectors such as pDZ, pACYC177, pACYC184, pCL, pECCG117, pUC19, pBR322, pMW118, pCC1BAC, etc. may be used.

For example, the polynucleotide encoding a target modified protein in the chromosome may be replaced with a modified polynucleotide through a vector for intracellular chromosomal insertion. The insertion of a polynucleotide into the chromosome may be performed using any method known in the art (e.g., homologous recombination), but the method is not limited thereto. The vector may further include a selection marker for confirming its successful insertion into the chromosome. The selection marker is used for selection of cells transformed with the vector, i.e., to confirm whether the target nucleic acid molecule has been inserted, and markers which confer selectable phenotypes (e.g., drug resistance, auxotrophy, resistance to cytotoxic agents, expression of surface proteins, etc.) may be used. Under the circumstances where selective agents are treated, only the cells capable of expressing the selection markers can survive or express other phenotypic traits, and thus, the transformed cells can be selected.

Still another aspect of the present disclosure provides a microorganism, which comprises the modified protein or a polynucleotide encoding the modified protein, and is thus capable of producing L-threonine. Specifically, the microorganism, which comprises the variant protein or a polynucleotide encoding the modified protein, may be a microorganism prepared by the transformation with a vector, which comprises a polynucleotide encoding the modified protein, but the microorganism is not limited thereto.

As used herein, the term "transformation" refers to the introduction of a vector, which comprises a polynucleotide encoding a target protein, into a host cell such that the protein encoded by the polynucleotide is expressed in the host cell. As long as the transformed polynucleotide can be expressed in the host cell, it may be integrated into and placed in the chromosome of the host cell, or it may be placed extrachromosomally, or irrespective thereof. Additionally, the polynucleotide includes DNA and RNA encoding the target protein. The polynucleotide may be introduced in any form, as long as it can be introduced into the host cell and expressed therein. For example, the polynucleotide may be introduced into the host cell in the form of an expression cassette, which is a gene construct including all the elements required for its autonomous expression. In general, the expression cassette may include a promoter operably linked to the polynucleotide, transcriptional termination signals, ribosome binding sites, and translation termination signals. The expression cassette may be in the form of a self-replicable expression vector. Additionally, the polynucleotide may be one which introduced into the host cell as it is and operably linked to a sequence required for expression in the host cell, but the polynucleotide is not limited thereto.

As used herein, the term "operably linked" means that a promoter sequence, which initiates and mediates transcription of the polynucleotide encoding the target modified protein of the present disclosure, is functionally linked to the above gene sequence.

Still another aspect of the present disclosure provides a microorganism of the genus *Corynebacterium*, which comprises the modified polypeptide of meso-diaminopimelate dehydrogenase or a polynucleotide encoding the same.

As used herein, the term "microorganism which comprises a modified polypeptide of meso-diaminopimelate dehydrogenase or a polynucleotide encoding the same" may refer to a recombinant microorganism, which is prepared such that the modified polypeptide of meso-diaminopimelate dehydrogenase of the present disclosure is expressed. For example, it may refer to a host cell or microorganism, which comprises a polynucleotide encoding a modified polypeptide of meso-diaminopimelate dehydrogenase or which is transformed with a vector comprising a polynucleotide encoding the modified polypeptide of meso-diaminopimelate dehydrogenase, and is thus capable of expressing the variant. For the purpose of the present disclosure, specifically, the microorganism is a microorganism which expresses a modified polypeptide of meso-diaminopimelate dehydrogenase, which includes one or more amino acid substitutions within the amino acid sequence of SEQ ID NO: 1, and the microorganism may be a microorganism which expresses a modified protein in which the $169^{th}$ amino acid from N-terminus in the amino acid sequence of SEQ ID NO: 1 is substituted with leucine and thus has an activity of the modified polypeptide of meso-diaminopimelate dehydrogenase, but the microorganism is not limited thereto.

The microorganism, which comprises the modified polypeptide of meso-diaminopimelate dehydrogenase or a polynucleotide encoding the same, may possibly be any microorganism, which comprises the modified polypeptide of meso-diaminopimelate dehydrogenase or a polynucleotide encoding the same and is thus capable of producing an L-amino acid (e.g., L-threonine), but the microorganism is not limited thereto. For example, the microorganism, which comprises the modified polypeptide of meso-diaminopimelate dehydrogenase or a polynucleotide encoding the same, may be a recombinant microorganism, which is prepared by introducing a polynucleotide encoding a modified polypeptide of meso-diaminopimelate dehydrogenase into a natural wild-type microorganism or a microorganism producing an L-amino acid, and is thus capable of expressing the modified polypeptide of meso-diaminopimelate dehydrogenase and has an enhanced ability of producing an L-amino acid. The recombinant microorganism with an enhanced ability of producing an L-amino acid may be a microorganism, which has an enhanced ability of producing an L-amino acid compared to the natural wild-type microorganism or a non-modified microorganism, and the L-amino acid may be L-threonine, but these are not limited thereto.

As used herein, the term "microorganism producing an L-amino acid" includes both a wild-type microorganism and a microorganism in which a natural or artificial genetic modification has occurred, and it may be a microorganism, in which a particular mechanism is weakened or enhanced due to the insertion of a foreign gene, due to the enhancement or inactivation of the activity of an endogenous gene, etc., wherein a genetic variation has occurred or the activity is enhanced so as to produce a desired L-amino acid. The subject microorganism may be a microorganism, which is genetically modified through any one or more selected from the group consisting of the modified polypeptide, a polynucleotide encoding the modified polypeptide, and a vector comprising the polynucleotide; a microorganism, which is modified so as to express the modified polypeptide or a polynucleotide encoding the modified polypeptide; a recombinant microorganism, which expresses the modified polypeptide or a polynucleotide encoding the modified polypeptide; or a recombinant microorganism, which has an activity of the modified polypeptide, but the microorganism is not limited thereto.

The microorganism producing an L-amino acid may be one which comprises the modified polypeptide or a polynucleotide encoding the modified polypeptide, or one into which a vector comprising the polynucleotide is introduced to have an enhanced ability of producing a desired L-amino acid. Specifically, the introduction may be achieved by transformation but is not limited thereto.

Additionally, in the present disclosure, the microorganism producing an L-amino acid or a microorganism having the ability of producing an L.-amino acid may be a microorganism, in which part of the gene(s) involved in the L-amino acid biosynthesis pathway is enhanced or weakened, or a microorganism, in which part of the gene(s) involved in the L-amino acid degradation pathway is enhanced or weakened.

For the purpose of the present disclosure, the microorganism may include any microorganism, which comprises the modified polypeptide and is thus capable of producing L-threonine or an amino acid derived from L-threonine.

The term "non-modified microorganism" refers to a natural strain itself; a microorganism which does not comprise the modified polypeptide of meso-diaminopimelate dehydrogenase; or a microorganism which is not transformed with a vector comprising the polynucleotide encoding the modified polypeptide of meso-diaminopimelate dehydrogenase. The "microorganism" may include a prokaryotic microorganism or a eukaryotic microorganism, as long as the microorganism can produce an L-amino acid. For example, the "microorganism" may include microorganisms of the genus *Escherichia*, the genus *Erwinia*, the genus *Serratia*, the genus *Providencia*, the genus *Corynebacterium*, and the genus *Brevibacterium*. Specifically, the microorganism may be a microorganism of the genus *Corynebacterium*, and more specifically *Corynebacterium glutamicum*, but the microorganism is not limited thereto.

Specifically, in order to enhance the biosynthesis pathway of L-threonine in the microorganism of the genus *Corynebacterium*, for example, the expression of a thrC gene which encodes threonine synthase; a ppe gene which encodes phosphoenolpyruvate carboxykinase; a galP gene which is involved in glucose uptake; a hysC gene which encodes lysine-sensitive aspartokinase 3; a hom gene which encodes homoserine dehydrogenase; a pyc gene which induces the increase of oxaloacetate pool, etc. may be enhanced or increased within the microorganism.

In order to release the feedback inhibition with respect to the L-threonine, for example, a gene modification may be introduced into the lysC gene, hom gene, thrA gene (which has a bifunctional property of aspartokinase/homoserine dehydrogenase 1), etc.

In order to inactivate the genes which weaken the biosynthesis pathway of L-threonine, for example, the expression of a pckA gene which is involved in the conversion of oxaloacetate (OAA) (i.e., an intermediate of L-threonine biosynthesis) to phosphoenolpyruvate (PEP); the expression of a tyrR gene which inhibits the expression of the lysC gene; the expression of a galR gene which inhibits the expression of a galP gene involved in glucose uptake; the expression of a mcbR gene (i.e., a DNA-binding transcriptional dual regulator); etc. may be weakened or inactivated within the microorganism.

In order to increase the activity of the operon of I.-threonine, a plasmid comprising a threonine operon, which consists of genes encoding aspartokinase, homoserine dehydrogenase, homoserine kinase, and threonine synthase (Japanese Patent Application Publication No. 2005-227977), a threonine operon derived from *E. coli*, etc., may be introduced into a microorganism (TURBA E, et al., *Agric. Biol. Chem.* 53:2269-2271. 1989), and thereby, the expression of the threonine operon may be increased within the microorganism.

Additionally, resistance may be conferred to L-threonine analogues (e.g., a-amino-β-hydroxy valeric acid, D,L-threonine hydroxamate, etc.).

Additionally, the genes, which act on the L-lysine biosynthesis pathway and have a common precursor to L-threonine (e.g., dihydrodipicolinate synthase (dapA) (i.e., 4-hydroxy-tetrahydrodipicolinate reductase), diaminopimelate decarboxylase (lysA), and diaminopimelate dehydrogenase (ddh)), may be weakened.

However, the methods of gene expression are not limited thereto, and the ability of producing L-threonine may be enhanced by a gene expression control method known in the art.

As used herein, the term "enhancement/increase" is a concept which includes all of the increases in the activity of a gene compared to its endogenous activity.

Such enhancement or increase of a gene activity may be achieved by applying various methods well known in the art. The enhancement or increase in a gene activity may be achieved by one or more methods selected from the group consisting of a method of increasing the copy number of a gene in a cell; a method of introducing a modification on the expression control sequence of a gene; a method of replacing the expression control sequence of a gene with a sequence having a stronger activity: a method of introducing a further modification on the corresponding gene so as to enhance the activity of the gene; and a method of introducing a foreign gene in a microorganism, and may be achieved by a combination of these methods, but the methods are not particularly limited thereto.

As used herein, the term "inactivation" is a concept which includes a case where the activity of a gene is weakened compared to an endogenous activity thereof and a case where a gene has no activity.

Such inactivation or weakening of the activity of a gene may be achieved by applying various methods well known in the art. Examples of these methods include: a method of deleting all or part of a gene on the chromosome, including a case where the activity of the gene is removed; a method of replacing a gene encoding a corresponding protein on the chromosome with a mutated gene so as to reduce the activity of the corresponding protein; a method of introducing a modification on the expression control sequence of a gene on the chromosome, which encodes the protein; a method of replacing the expression control sequence of a gene encoding the protein with a sequence with a weaker activity or no activity (e.g., a method of replacing the promoter of the gene with a promoter having a weaker activity compared to its endogenous promoter); a method of deleting all or part of a gene on the chromosome, which encodes the protein; a method of introducing an antisense oligonucleotide (e.g., antisense RNA), which binds complementarily to a transcript of the gene on the chromosome, which encodes the protein, and thereby inhibits the translation of the mRNA into a protein; a method of artificially adding a sequence, which is complementary to the Shine-Dalgarno (SD) sequence, to an upstream region of the SD sequence of a gene on the chromosome, which encodes the protein, and forming a secondary structure thereby making the attachment of a ribosome impossible; a method of reverse transcription engineering (RTE), in which a promoter is added to the 3' end of the open reading frame (ORF) of the corresponding sequence to be transcribed reversely; etc. In addition, the inactivation or weakening of the activity of a gene may be achieved by a combination of these methods, but the methods are not particularly limited thereto.

For example, the enhancement of the activities of lysC, hom, and pyc genes may be achieved by a method of increasing the copy number of a gene in a cell; a method of introducing a modification on the expression control sequence of a gene; a method of replacing the expression control sequence of a gene with a sequence having a stronger activity; a method of introducing a further modification on the corresponding gene so as to enhance the activity of the gene; a method of introducing a foreign gene in a microorganism; etc., but the methods are not particularly limited thereto and any known method for the enhancement or increase of a gene activity may be used without limitation.

For example, the weakening of the activities of dapA, ddh, and lysA genes may be achieved by a method of deleting all or part of a gene on the chromosome, including a case where the activity of the gene is removed; a method of replacing a gene encoding a corresponding protein on the chromosome with a mutated gene so as to reduce the activity of the corresponding protein; a method of introducing a modification on the expression control sequence of a gene on the chromosome, which encodes the protein; a method of replacing the expression control sequence of a gene encoding the protein with a sequence with a weaker activity or no activity (e.g., a method of replacing the promoter of the gene with a promoter having a weaker activity compared to its endogenous promoter); a method of deleting all or part of a gene on the chromosome, which encodes the protein; etc., but the methods are not limited thereto and any known method for weakening a gene activity may be used without limitation.

Additionally, in the present disclosure, the microorganism including the modified polypeptide of meso-diaminopimelate dehydrogenase may further include one or more selected from the following modified polypeptides, or one or more selected from the polynucleotides encoding the following modified polypeptides.

The modified polypeptide to be further included may be one or more selected from a modified polypeptide of dihydrodipicolinate reductase (dapB) (i.e., 4-hydroxy-tetrahydrodipicolinate reductase), wherein the $13^{th}$ amino acid in the amino acid sequence of SEQ ID NO: 81, arginine, is substituted with asparagine; a modified polypeptide of diaminopimelate decarboxylase (lysA), wherein the $408^{th}$ amino acid in the amino acid sequence of SEQ ID NO: 82, methionine, is substituted with alanine; and a modified polypeptide of dihydrodipicolinate synthase (dapA), wherein the $119^{th}$ amino acid in the amino acid sequence of SEQ ID NO: 83, tyrosine, is substituted with phenylalanine.

The amino acid sequence of the modified polypeptide of dihydrodipicolinate reductase, wherein the $13^{th}$ amino acid in the amino acid sequence of SEQ ID NO: 81, arginine, is substituted with asparagine, may be SEQ ID NO: 66, but the amino acid sequence is not limited thereto. In the present disclosure, the introduction of the modified polypeptide or a polynucleotide encoding the same can reduce the amount of lysine production while increasing the amount of threonine production.

The amino acid sequence of the modified polypeptide of diaminopimelate decarboxylase, wherein the $408^{th}$ amino acid in the amino acid sequence of SEQ ID NO: 82, methionine, is substituted with alanine, may be SEQ ID NO: 71, but the amino acid sequence is not limited thereto. The diaminopimelate decarboxylase is the final enzyme acting on lysine biosynthesis, and the substitution of the $408^{th}$ amino acid from methionine to alanine can reduce the amount of lysine production while increasing the amount of threonine production.

The amino acid sequence of the modified polypeptide of dihydrodipicolinate synthase, wherein the $119^{th}$ amino acid in the amino acid sequence of SEQ ID NO: 83, tyrosine, is substituted with phenylalanine, may be SEQ ID NO: 76, but the amino acid sequence is not limited thereto. The dihydrodipicolinate synthase is an enzyme for biosynthesis of lysine from aspartyl semialdehyde (i.e., a common precursor for lysine and threonine), and the substitution of the 119th amino acid from tyrosine to phenylalanine can reduce the amount of producing lysine while increasing the amount of threonine production.

Still another aspect of the present disclosure provides a method for preparing threonine or an L-amino acid derived from threonine, which comprises a step of culturing in a medium a microorganism of the genus *Corynebacterium* comprising a modified polypeptide with an activity of the meso-diaminopimelate dehydrogenase.

The L-amino acid derived from threonine may include not only the L-amino acids derived from threonine, but also derivatives thereof. For example, the L-amino acid derived from threonine may be L-threonine, L-isoleucine, O-acetyl-L-homoserine, O-succinyl-L-homoserine, O-phospho-L-homoserine, L-methionine, and/or L-glycine, but the L-amino acid derived from threonine is not limited thereto. More specifically, the L-amino acid derived from threonine may be L-threonine, L-isoleucine, O-acetyl-L-homoserine, O-succinyl-L-homoserine, and/or L-methionine, but the L-amino acid derived from threonine is not limited thereto.

In the above method, the step of culturing the microorganism is not particularly limited, but may be performed in batch culture, continuous culture, fed-batch culture, etc. known in the art. In particular, the culture conditions are not particularly limited, but an optimal pH (e.g., pH 5 to 9, specifically pH 6 to 8, and most specifically pH 6.8) can be adjusted using a basic compound (e.g., sodium hydroxide, potassium hydroxide, or ammonia) or an acidic compound (e.g., phosphoric acid or sulfuric acid), and an aerobic state can be maintained by introducing oxygen or an oxygen-containing gas mixture to a culture, but the culture conditions are not limited thereto. The culture temperature may be maintained at 20° C. to 45° C., and specifically 25° C. to 40° C., and the culture may be performed for about 10 hours to about 160 hours, but these are not limited thereto, Additionally, the L-amino acid produced by the culture may be secreted into the medium or remain in the cells.

Moreover, as a carbon source to be used in the medium for culture, saccharides and carbohydrates (e.g., glucose, sucrose, lactose, fructose, maltose, molasses, starch, and cellulose), oils and fats (e.g., soybean oil, sunflower oil, peanut oil, and coconut oil), fatty acids (e.g., palmitic acid, stearic acid, and linoleic acid), alcohols (e.g., glycerol and ethanol), organic acids (e.g., acetic acid), etc. may be used alone or in combination, but the carbon source is not limited thereto. As a nitrogen source, a nitrogen-containing organic compound (e.g., peptone, a yeast extract, meat gravy, a malt extract, corn steep liquor, bean flour, and urea), and an inorganic compound (e.g., ammonium sulfate, ammonium chloride, ammonium phosphate, ammonium carbonate, and ammonium nitrate), etc. may be used alone or in combination, but the nitrogen source is not limited thereto. As a phosphorous source, potassium dihydrogen phosphate, dipotassium hydrogenphosphate, sodium-containing salts corresponding thereto, etc. may be used alone or in combination, but the phosphorous source is not limited thereto. Additionally, the medium may include essential growth-promoting materials, such as metal salts (e.g., magnesium sulfate or iron sulfate), amino acids, and vitamins.

The step of culturing the microorganism of the present disclosure may further include a step of recovering L-threonine or L-amino acids derived from L-threonine from the cultured medium and the microorganism.

With respect to the method of recovering the L-threonine or L-amino acids derived from L-threonine produced in the culturing step, the desired L-threonine or L-amino acids derived from L-threonine can be collected from the culture solution using an appropriate method known in the art according to the culture method. For example, centrifugation, filtration, anion-exchange chromatography, crystallization, HPLC, etc. can be used, and the desired L-threonine or L-amino acids derived from L-threonine can be recovered from the cultured medium or microorganism using an appropriate method known in the art.

The recovery step may include a purification step, which may be performed using an appropriate method known in the art. Therefore, the recovered L-threonine or L-amino acids derived from L-threonine may be in a purified form or a fermentation liquid of the microorganism including the L-amino acid (Introduction to Biotechnology and Genetic Engineering, A. J. Nair., 2008).

Still another aspect of the present disclosure provides a composition for producing I.-threonine, which comprises: a microorganism that comprises the modified polypeptide of the present disclosure having an activity of meso-diaminopimelate dehydrogenase, a polynucleotide encoding the modified polypeptide, and a vector comprising the polynucleotide, or any one of these; or a culture solution containing the microorganism.

The meso-diaminopimelate dehydrogenase, the modified polypeptide thereof, the polynucleotide, the vector, and the microorganism are the same as described above.

The microorganism may be a microorganism of the genus *Corynebacterium*, and specifically *Corynebacterium glutamicum*, but the microorganism is not limited thereto. This is the same as described above.

The composition for producing L-threonine may refer to a composition, which is capable of producing L-threonine by a modified polypeptide that has an activity of meso-diaminopimelate dehydrogenase. The composition may include, without limitation, a modified polypeptide having the activity of meso-diaminopimelate dehydrogenase or a constitution capable of operating the modified polypeptide having the activity of meso-diaminopimelate dehydrogenase. The modified polypeptide having an activity of meso-diaminopimelate dehydrogenase may be in a form where it is included within a vector so as to express the gene operably linked thereto in a host cell, into which it is introduced.

The composition may further comprise a lyoprotectant or an excipient. The lyoprotectant or excipient may be a non-naturally occurring material or naturally-occurring material, but is not limited thereto. In another specific embodiment, the lyoprotectant or excipient may be a material with which the microorganism does not naturally come into contact, or a material that is not naturally contained simultaneously with the microorganism, but is not limited thereto.

Still another aspect of the present disclosure provides a use of a microorganism, which comprises the modified polypeptide of meso-diaminopimelate dehydrogenase of the present disclosure, a polynucleotide encoding the modified polypeptide, a vector comprising the polynucleotide, or any one of these, for the production of L-threonine or L-amino acids derived from L-threonine.

DETAILED DESCRIPTION OF THE INVENTION

Hereinafter, the present disclosure will be described in more detail with reference to the following Examples. However, these Examples are for illustrative purposes only and the scope of the invention is not limited by these Examples.

Example 1: Preparation of Vector Library for Introduction of Modification within ORF of Ddh Gene In order to discover variants in which the expression level of the ddh gene of *Corynebacterium glutamicum* or an activity thereof is reduced, a library was prepared by the method shown below.

First, in order to introduce 0 to 4.5 modifications per 1 kb of a DNA fragment (963 bp) consisting of the ddh gene (963 bp), a Genemorph® II Random Mutagenesis kit (Stratagene®) was used. Error-prone PCR was performed using the chromosomal DNA of *Corynebacterium glutamicum* ATCC13032 (WT) as a template along with primers of SEQ ID NOS: 5 and 6. Specifically, the reaction solution, which contained the chromosomal DNA of the WT strain (500 ng), primers of SEQ ID NOS: 5 and 6 (125 ng each), Mutazyme® II reaction buffer (IX), dNTP mix (40 mM), and Mutazyme® II DNA polymerase (2.5 U), was subjected to the following conditions: denaturation at 94° C.' for 2 minutes; 25 cycles of denaturation at 94° C. for 1 minute, annealing at 56° C. for 1 minute, and polymerization at 72° C. for 3 minutes; and polymerization at 72° C. for 10 minutes.

The amplified gene fragment was ligated to the pCRII vector using a TOPO® TA Cloning® Kit (Invitrogen®), and the resulting vector was transformed into *E. coli* DH5α, and the transformants were plated on a LB solid medium containing kanamycin (25 mg/L). After selecting 20 kinds of transformed colonies, a plasmid was obtained from each of the transformed colonies. As a result of analysis of the nucleotide sequences, it was found that modifications were introduced on mutually-different locations at a frequency of 0.5 mutations/kb. Finally, about 10,000 transformed *E. coli* colonies were collected and the plasmid was extracted therefrom. The resultant was named as pTOPO®-ddh(mt) library.

Example 2: Preparation of Ddh-Deleted Strain and Screening of Random Mutagenesis Library In order to confirm the effect of ddh deletion on L-lysine production, the *Corynebacterium glutamicum* KCCM11016P strain (Korean Patent No. 10-0159812) was used. To prepare the *Corynebacterium glutamicum* KCCM11016P strain (in which the ddh gene is deleted) a pDZ-Δddh vector (in which the ddh gene is deleted) was prepared as follows.

Specifically, the vector was prepared in such a form that DNA fragments (600 bp each) located at 5' and 3' ends of the ddh gene were each ligated to the pDZ vector (Korean Patent Application Publication No. 2009-0094433). Based on the nucleotide sequence of the ddh gene reported (SEQ ID NO: 2), primers of SEQ ID NOS: 7 and 8 (into which the recognition site of the restriction enzyme XbaI was inserted at the 5' fragment and the 3' fragment, respectively) and primers of SEQ ID NOS: 9 and 10 (which are separated from the SEQ ID NOS: 7 and 8 by 663 bp, respectively) were synthesized (Table 1). The 5' end gene fragment was prepared by PCR using the chromosomal DNA of *Corynebacterium glutamicum* ATCC13032 as a template along with primers of SEQ ID NOS: 7 and 9. In the same manner, the gene fragment located at the 3' end of the ddh gene was prepared by PCR using the primers of SEQ ID NOS: 8 and 10. The PCR was performed as follows: denaturation at 94° C. for 2 minutes; 30 cycles of denaturation at 94° C. for 1 minute, annealing at 56° C. for 1 minute, and polymerization at 72° C. for 40 seconds; and polymerization at 72° C. for 10 minutes.

Meanwhile, the pDZ vector (which was digested with a restriction enzyme XbaI and then subjected to heat treatment at 65° C. for 20 minutes) was ligated to the insertion DNA fragment amplified through PCR using the In-Fusion® Cloning kit, and the resultant was transformed into *E. coli* DH5α, and the transformants were plated on a LB solid medium containing kanamycin (25 mg/L). After selecting the colonies transformed with the vector, into which the desired gene was inserted through PCR using the primers of SEQ ID NOS: 7 and 8, the plasmid was obtained by a plasmid extraction method commonly known in the art, and the obtained plasmid was named as pDZ-Δddh.

TABLE 1

| SEQ ID NO | Sequence (5'->3') |
|---|---|
| SEQ ID NO: 7 | CGGGGATCCTCTAGATGACCAACATCCGCG |
| SEQ ID NO: 8 | CAGGTCGACTCTAGATTAGACGTCGCGTGCG |
| SEQ ID NO: 9 | CGGTGAAATCGGCGACATCAAAGACTG |
| SEQ ID NO: 10 | GATGTCGCCGATTTCACCGCTTCCTC |

The prepared vector pDZ-Δddh was transformed into the *Corynebacterium glutamicum* KCCM11016P strain by electroporation (Van der Rest et al., *Appl. Microbiol. Biotechnol* 52:541-545, 1999), and then a strain in which the ddh gene is deleted was prepared by homologous chromosome recombination. The prepared strain in which the ddh gene is deleted was named as *Corynebacterium glutamicum* WT::Δddh.

Additionally, the pTOPO®-ddh(mt) library, which was prepared in Example I above, was transformed into the KCCM11016P::Δddh strain by electroporation, and the transformants were plated on a complex plate medium containing kanamycin (25 mg/L), and about 20,000 colonies were obtained therefrom. Each colony was inoculated into the following selection medium (300 μL) and then cultured in a 96-deep well plate at 1,000 rpm at 32° C. for about 24 hours.

<Selection Medium (pH 8.0)>

10 g glucose. 5.5 g ammonium sulfate, 1.2 g $MgSO_4·7H_2O$, 0.8 g $KH_2PO_4$, 16.4 g $K_2HPO_4$, 100 μg biotin, 1 mg thiamine HCL, 2 mg calcium-pantothenate, 2 mg nicotinamide (per 1 L distilled water)

The amount of L-lysine produced in the culture solution was analyzed using the ninhydrin method (Moore, S., Stein, W. H., Photometric ninhydrin method for use in the chromatography of amino acids. *J. Biol. Chem.* 1948, 176, 367-388).

After completion of the culture, the culture supernatant (10 μL) and the ninhydrin reaction solution (190 μL) were reacted at 65° C. for 30 minutes, and the absorbance was measured at the wavelength of 570 nm using a spectrophotometer. The WT strain and the WT::Δddh strain were used as control groups. Sixty kinds of strains, which showed a lower absorbance compared to the WT strain (i.e., the wild-type) while showing a higher absorbance compared to the WT::Δddh strain, were selected.

The selected 60 kinds of strains were cultured again in the same manner as described above, and the ninhydrin reaction was performed repeatedly. As a result, top 5 kinds of mutant strains, which showed an enhanced ability of producing L-lysine compared to the KCCM11016P::Δddh strain but a reduced ability of producing L-lysine compared to the KCCM11016P strain, were selected. The selected 5 kinds of strains were named as KCCM11016P::ddh(mt)-1 to KCCM11016P::ddh(mt)-5 (Table 2), respectively.

TABLE 2

Concentration of L-lysine production by 5 kinds of selected random mutant strains

| | | Absorbance (572 nm) | | | |
|---|---|---|---|---|---|
| | Strain | Batch 1 | Batch 2 | Batch 3 | Average |
| Control Group | KCCM11016P | 0.228 | 0.205 | 0.216 | 0.215 |
| 1 | KCCM11016P::ddh(mt)-1 | 0.214 | 0.193 | 0.205 | 0.204 |
| 2 | KCCM11016P::ddh(mt)-2 | 0.185 | 0.181 | 0.179 | 0.182 |
| 3 | KCCM11016P::ddh(mt)-3 | 0.164 | 0.163 | 0.145 | 0.157 |
| 4 | KCCM11016P::ddh(mt)-4 | 0.135 | 0.141 | 0.128 | 0.135 |
| 5 | KCCM11016P::ddh(mt)-5 | 0.198 | 0.201 | 0.189 | 0.196 |
| Control Group | KCCM11016P::Δddh | 0.106 | 0.112 | 0.098 | 0.105 |

Example 3: Confirmation of Nucleotide Sequences of 5 Kinds of Modified Strains of Ddh In order to confirm the nucleotide sequences of the ddh gene of the 5 kinds of selected strains (i.e., KCCM11016P::ddh(mt)-1 to KCCM11016P::ddh(mt)-5), the DNA fragments including the ddh gene in the chromosome were amplified by PCR using the primers shown in Example 1 (SEQ ID NOS: 5 and 6). The PCR was performed as follows: denaturation at 94° C. for 2 minutes; 30 cycles of denaturation at 94° C. for 1 minute, annealing at 56° C. for 1 minute, and polymerization at 72° C. for 40 seconds; and polymerization at 72° C. for 10 minutes.

TABLE 3

| SEQ ID NO | Sequence (5'->3') |
|---|---|
| SEQ ID NO: 5 | ATGACCAACATCCGCGTAGC |
| SEQ ID NO: 6 | TTAGACGTCGCGTGCGATCAG |

As a result of the analysis of the nucleotide sequences of the amplified gene, it was found that the 5 kinds of strains were: 1) a variant, in which a modification is introduced into the nucleotide sequence located at the $37^{th}$ position downstream of the ORF start codon of the ddh gene, and thus, the original sequence 'AAC' is converted to 'GAC' (i.e., the 130 amino acid from the N-terminus (i.e., asparagine) is substituted with aspartic acid); ii) a variant, in which three modifications are introduced into the nucleotide sequence including the $106^{th}$ to the $108^{th}$ nucleotides downstream of the ORF start codon of the ddh gene, and thus, the original sequence 'CGC' is converted to 'ATG' (i.e., the $36^{th}$ amino acid from the N-terminus (i.e., arginine) is substituted with methionine); iii) a variant, in which two modifications are introduced into the nucleotide sequence including the $448^{th}$ to the $449^{th}$ nucleotides downstream of the ORF start codon of the ddh gene, and thus, the original sequence 'CAG' is converted to 'ATG' (i.e., the $150^{th}$ amino acid from the N-terminus (i.e., glutamine) is substituted with methionine); iv) a variant, in which two modifications are introduced into the nucleotide sequence including the $505^{th}$ to the $506^{th}$ nucleotides downstream of the ORF start codon of the ddh gene, and thus, the original sequence 'ACC' is converted to 'CTC' (i.e., the $169^{th}$ amino acid from the N-terminus (i.e., threonine) is substituted with leucine); and v) a variant, in which two modifications are introduced into the nucleotide sequence including the $584^{th}$ to the $585^{th}$ nucleotides downstream of the ORF start codon of the ddh gene, and thus, the original sequence 'CGC' is converted to 'CAA' (i.e., the $195^{th}$ amino acid from the N-terminus (i.e., arginine) is substituted with glutamine).

Example 4: Preparation of ATCC13032 Strains into which 5 Kinds of Ddh Modifications are Introduced, and Evaluation of their Abilities of Producing Threonine and Lysine With respect to the 5 kinds of modifications confirmed in Example 3 above, in order to finally select the strains where the ability of producing L-lysine is reproducibly reduced while the ability of producing L-threonine is increased, wild-type-derived strains into which a modification is introduced were prepared.

In order to prepare strains into which a modified ddh gene is introduced in the *Corynebacterium glutamicum* ATCC13032 strain, 5 kinds of vectors, into which the modified ddh gene can be introduced (i.e., pDZ::ddh m1 to pDZ::ddh m5), were prepared as follows.

Specifically, the vector was prepared in such a form that DNA fragments (963 bp each) located at 5' and 3' ends of the ddh gene were each ligated to the pDZ vector (Korean Patent No. 2009-0094433). Based on the nucleotide sequence of the ddh gene reported (SEQ ID NO: 2), a primer of SEQ ID NO: 11 (into which the recognition site of the restriction enzyme XbaI was inserted at the 5' fragment and the 3' fragment, respectively) and a primer of SEQ ID NO: 12 (which is separated from the SEQ ID NO: 11 by 931 bp, respectively) were synthesized.

Modified DNA fragments were prepared by PCR using the chromosomal DNA of KCCM11016P::ddh(mt)-1 to KCCM11016P::ddh(mt)-5 confirmed in Example 3 above along with the primers of SEQ ID NOS: 11 and 12. The PCR was performed as follows: denaturation at 94° C. for 2 minutes; 30 cycles of denaturation at 94° C. for 1 minute, annealing at 56° C. for 1 minute, and polymerization at 72° C. for 40 seconds; and polymerization at 72° C. for 10 minutes.

Meanwhile, the pDZ vector (which was digested with a restriction enzyme XbaI and then subjected to heat treatment at 65° C. for 20 minutes) was ligated to the modified DNA fragments amplified through PCR using the In-Fusion& Cloning kit, and the resultants were each transformed into *E. coli* DH5α, and the transformants were plated on a LB solid medium containing kanamycin (25 mg/L). After selecting the colonies transformed with the vector, into which the desired gene was inserted through PCR using the primers of SEQ ID NOS: 11 and 12, the plasmids were obtained by a plasmid extraction method commonly known in the art, and the obtained plasmids were named as pDZ::ddh(mt)1 to pDZ::ddh(mt)5, respectively.

The prepared vectors (i.e., pDZ::ddh(mt)1 to pDZ::ddh (mt)5) were each transformed into the *Corynebacterium glutamicum* ATCC13032 strain by electroporation, and were then subjected to a second cross-over process, and thereby strains, in each of which part of the nucleotide sequence of the ddh gene is substituted with a modified nucleotide(s) on the chromosome, were obtained. Whether the substitution was appropriate was determined by the mutant allele specific amplification (MASA) PCR technology (Takeda et al., *Hum. Mutation.* 2, 112-117 (1993)) using the following primer pairs, where in the primer pair of SEQ ID NO: 13 and SEQ ID NO: 14, which agrees with the modified sequences, the appropriateness of the substitution was first determined by selecting the strain to be amplified, and the sequence analysis of the ddh gene of the selected strain was confirmed secondarily by analyzing the modified sequences using the primer pair of SEQ ID NO: 13 and SEQ ID NO: 15. The prepared strains, into each of which a modified ddh gene is introduced, were named as *Corynebacterium glutamicum* ATCC13032::ddh(mt)1 to *Corynebacterium glutamicum* ATCC13032: ddh(mt)5, respectively.

TABLE 4

| SEQ ID NO | Sequence (5'->3') |
|---|---|
| SEQ ID NO: 11 | CGGGGATCCTCTAGATGACCAACATCCGCG |
| SEQ ID NO: 12 | CAGGTCGACTCTAGATTAGACGTCGCGTGCG |
| SEQ ID NO: 13 | CACAATTTTGGAGGATTAC |
| SEQ ID NO: 14 | TGGGTGACCACGATCAGAT |
| SEQ ID NO: 15 | GGAAACCACACTGTTTCC |

With respect to the 5 kinds of strains into which 5 kinds of modifications are introduced, in order to finally select the strains where the ability of producing L-lysine is reproducibly reduced while the ability of producing L-threonine is increased, flask culture was performed using the following media. After completion of the culture, the concentrations of L-lysine and threonine in the culture solution were analyzed using HPLC, and the concentrations of L-lysine and threonine produced in each mutant strain are shown in Tables 5 and 6 below.

<Seed Medium (pH 7.0)>
20 g glucose, 10 g peptone, 5 g yeast extract, 1.5 g urea, 4 g KH$_2$PO$_4$, 8 g K$_2$HPO$_4$, 0.5 g MgSO$_4$·7H$_2$O, 100 μg biotin, 1 mg thiamine HCl, 2 mg calcium-pantothenate, 2 mg nicotinamide (per 1 L distilled water)

<Production Medium (pH 7.0)>
100 g glucose, 40 g (NH$_4$)$_2$SO$_4$, 2.5 g soybean protein, 5 g corn steep solids, 3 g urea, 1 g KH$_2$PO$_4$, 0.5 g MgSO$_4$·7H$_2$O, 100 μg biotin, 1 mg thiamine HCl, 2 mg calcium-pantothenate, 3 mg nicotinamide, 30 g CaCO$_3$ (per 1 L distilled water)

TABLE 5

Concentrations of L-lysine produced by 5 kinds of selected random mutant strains

| | Strain | L-lysine (g/L) | | | | Glucose Consumption Rate (g/hr) |
| | | Batch 1 | Batch 2 | Batch 3 | Average | |
|---|---|---|---|---|---|---|
| Control Group | ATCC13032 | 1.25 | 1.20 | 1.19 | 1.21 | 4.33 |
| 1 | ATCC13032::ddh (mt)1 | 1.20 | 1.15 | 1.19 | 1.18 | 4.30 |
| 2 | ATCC13032::ddh (mt)2 | 1.05 | 1.10 | 1.02 | 1.06 | 4.21 |
| 3 | ATCC13032::ddh (mt)3 | 0.85 | 0.88 | 0.90 | 0.88 | 3.79 |
| 4 | ATCC13032::ddh (mt)4 | 0.75 | 0.79 | 0.76 | 0.77 | 3.71 |
| 5 | ATCC13032::ddh (mt)5 | 1.11 | 1.08 | 1.13 | 1.11 | 4.12 |
| Control Group | ATCC13032::Δddh | 0.70 | 0.68 | 0.71 | 0.70 | 3.56 |

TABLE 6

Concentrations of L-threonine produced by 5 kinds of selected random mutant strains

| | Strain | L-threonine (g/L) | | | |
| | | Batch 1 | Batch 2 | Batch 3 | Average |
|---|---|---|---|---|---|
| Control Group | ATCC13032 | 0.35 | 0.37 | 0.36 | 0.36 |
| 1 | ATCC13032::ddh (mt)1 | 0.38 | 0.37 | 0.35 | 0.37 |
| 2 | ATCC13032::ddh (mt)2 | 0.39 | 0.39 | 0.37 | 0.38 |
| 3 | ATCC13032::ddh (mt)3 | 0.40 | 0.39 | 0.41 | 0.40 |
| 4 | ATCC13032::ddh (mt)4 | 0.42 | 0.43 | 0.42 | 0.42 |
| 5 | ATCC13032::ddh (mt)5 | 0.37 | 0.38 | 0.37 | 0.37 |
| Control Group | ATCC13032::Δddh | 0.45 | 0.41 | 0.42 | 0.43 |

Among the selected 5 kinds of mutant strains, as a strain in which the ability of producing L-lysine is significantly reduced while the ability of producing L-threonine is enhanced, the ATCC13032::ddh(mt)4 strain was selected.

Example 5: Preparation of ATCC13869 Strains into which 5 Kinds of Ddh Modifications are Introduced, and Evaluation of their Abilities of Producing Threonine and Lysine With respect to the 5 kinds of modifications confirmed in Example 3 above, in order to finally select the strains where the ability of producing L-lysine is reproducibly reduced while the ability of producing L-threonine is increased, wild-type-derived strains into which a modification is introduced were prepared.

In order to prepare strains into each of which a modified ddh gene is introduced in the *Corynebacterium glutamicum* ATCC13869 strain, the vectors prepared in Example 4 (i.e., pDZ::ddh(mt)1 to pDZ::ddh(mt)5) were transformed into the *Corynebacterium glutamicum* ATCC13869 strain by electroporation, and the transformants were subjected to a second cross-over, and thereby strains, in each of which part of the nucleotide sequence of the ddh gene is substituted with a modified nucleotide(s) on the chromosome, were obtained. Whether the substitution was appropriate was determined by the mutant allele specific amplification (MASA) PCR technology (Takeda et al., *Hum. Mutation*, 2, 112-117 (1993)) using the following primer pairs, where in the primer pair of SEQ ID NO: 13 and SEQ ID NO: 14, which agrees with the modified sequences, the appropriateness of the substitution was first determined by selecting the strain to be amplified, and the sequence analysis of the ddh gene of the selected strain was confirmed secondarily by analyzing the modified sequences using the primer pair of SEQ ID NO: 13 and SEQ ID NO: 15. The prepared strains, into each of which a modified ddh gene is introduced, were named as *Corynebacterium glutamicum* ATCC13869::ddh (mt)1 to *Corynebacterium glutamicum* ATCC13869::ddh (mt)5, respectively.

With respect to the 5 kinds of strains into which 5 kinds of modifications are introduced, in order to finally select the strains where the ability of producing L-lysine is reproducibly reduced while the ability of producing L-threonine is increased, flask culture was performed using the following media. After completion of the culture, the concentrations of L-lysine and threonine in the culture solution were analyzed using HPLC, and the concentrations of L-lysine and threonine produced in mutant strains are shown in Tables 7 and 8 below.

<Seed Medium (pH 7.0)>
20 g glucose, 10 g peptone, 5 g yeast extract, 1.5 g urea, 4 g KH$_2$PO$_4$, 8 g K$_2$HPO$_4$, 0.5 g MgSO$_4$·7H$_2$O, 100 μg biotin, 1 mg thiamine HCl, 2 mg calcium-pantothenate, 2 mg nicotinamide (per 1 L distilled water)

<Production Medium (pH 7.0)>
100 g glucose, 40 g (NH$_4$)$_2$SO$_4$, 2.5 g soybean protein, 5 g corn steep solids, 3 g urea, 1 g KH$_2$PO$_4$, 0.5 g MgSO$_4$·7H$_2$O, 100 μg biotin, 1 mg thiamine HCl, 2 mg calcium-pantothenate, 3 mg nicotinamide, 30 g CaCO$_3$ (per 1 L distilled water)

TABLE 7

Concentrations of L-lysine produced by 5 kinds of selected random mutant strains

| | Strain | L-lysine (g/L) | | | | Glucose Consumption Rate (g/hr) |
| --- | --- | --- | --- | --- | --- | --- |
| | | Batch 1 | Batch 2 | Batch 3 | Average | |
| Control Group | ATCC13869 | 1.21 | 1.22 | 1.22 | 1.22 | 4.03 |
| 1 | ATCC13869::ddh (mt)1 | 1.19 | 1.19 | 1.20 | 1.19 | 3.98 |
| 2 | ATCC13869::ddh (mt)2 | 1.08 | 1.07 | 1.10 | 1.08 | 3.89 |
| 3 | ATCC13869::ddh (mt)3 | 0.88 | 0.87 | 0.85 | 0.87 | 3.75 |
| 4 | ATCC13869::ddh (mt)4 | 0.73 | 0.77 | 0.76 | 0.75 | 3.68 |
| 5 | ATCC13869::ddh (mt)5 | 1.09 | 1.11 | 1.12 | 1.11 | 3.89 |
| Control Group | ATCC13032::Δddh | 0.71 | 0.69 | 0.71 | 0.70 | 3.47 |

TABLE 8

Concentrations of L-threonine produced by 5 kinds of selected random mutant strains

| | Strain | L-threonine (g/L) | | | |
| --- | --- | --- | --- | --- | --- |
| | | Batch 1 | Batch 2 | Batch 3 | Average |
| Control Group | ATCC13869 | 0.25 | 0.27 | 0.28 | 0.27 |
| 1 | ATCC13869::ddh (mt)1 | 0.27 | 0.29 | 0.27 | 0.28 |
| 2 | ATCC13869::ddh (mt)2 | 0.30 | 0.31 | 0.31 | 0.31 |
| 3 | ATCC13869::ddh (mt)3 | 0.35 | 0.33 | 0.36 | 0.35 |
| 4 | ATCC13869::ddh (mt)4 | 0.38 | 0.39 | 0.38 | 0.38 |
| 5 | ATCC13869::ddh (mt)5 | 0.31 | 0.29 | 0.32 | 0.31 |
| Control Group | ATCC13869::Δddh | 0.40 | 0.41 | 0.39 | 0.40 |

With respect to the ATCC13869::Δddh strain, in which ddh is deleted compared to the ATCC13869 strain (i.e., a wild-type strain), it was confirmed that the glucose consumption rate was significantly reduced and thus inhibiting the growth of the strain. In contrast, with respect to the selected 5 kinds of strains, it was confirmed that the amount of L-lysine production was reduced but the amount of L-threonine production was increased, while the glucose consumption rate was maintained at a level equivalent to that of the wild-type strain.

Among the selected 5 kinds of mutant strains, as a strain in which the ability of producing L-lysine is significantly reduced while the ability of producing L-threonine is enhanced, the ATCC13032::ddh(mt)4 strain was selected as in Example 4.

Example 6: Preparation of Strains into which Modified Ddh is Introduced in Microorganism of the Genus *Corynebacterium* Having Ability of Producing L-Threonine and Evaluation of the Ability of Producing L-Threonine A strain producing L-threonine was developed from the wild-type *Corynebacterium glutamicum* ATCC13032 strain. Specifically, in order to release the feedback inhibition of aspartate kinase (lysC), which acts as the first important enzyme in the L-threonine biosynthesis pathway, the 377$^{th}$ amino acid of lysC (i.e., leucine) was substituted with lysine (SEQ ID NO: 16).

More specifically, in order to prepare strains into each of which a lysC (L377K) modification is introduced, PCR was performed using the chromosomal DNA of *Corynebacterium glutamicum* ATCC13032 as a template along with a primer pair of SEQ ID NOS: 17 and 18 or a primer pair of SEQ ID NOS: 19 and 20, respectively. PfuUltra® high-fidelity DNA polymerase (Stratagene®) was used as polymerase for a PCR reaction. The PCR was performed as follows: 28 cycles of denaturation at 95° C. for 30 seconds, annealing at 55° C. for 30 seconds, and polymerization at 72° C. for 1 minute.

As a result, with respect to the modification of the lysC gene, a 515 bp DNA fragment in the 5' upstream region and a 538 bp DNA fragment in the 3' downstream region were obtained, respectively. PCR was performed using the two amplified DNA fragments as templates along with the primers of SEQ ID NO: 17 and SEQ ID NO: 20. The PCR was performed as follows: denaturation at 95° C. for 5 minutes; 28 cycles of denaturation at 95° C. for 30 seconds, annealing at 55° C. for 30 seconds, and polymerization at 72° C. for 2 minutes; and polymerization at 72° C. for 5 minutes.

TABLE 9

| SEQ ID NO | Sequence (5'->3') |
| --- | --- |
| SEQ ID NO: 17 | TCGAGCTCGGTACCCGCTGCGCAGTGTTGAATAC |
| SEQ ID NO: 18 | TGGAAATCTTTTCGATGTTCACGTTGACAT |
| SEQ ID NO: 19 | ATGTCAACGTGAACATCGAAAAGATTTCCA |
| SEQ ID NO: 20 | CTCTAGAGGATCCCCGTTCACCTCAGAGACGATT |

As a result, a 1,023 bp DNA fragment, which includes a modification of the lysC gene that encodes an aspartokinase variant where the 377$^{th}$ amino acid (i.e., leucine) is substituted with lysine, was amplified. The amplified product was purified using a PCR purification kit (QIAGEN®) and used as an insertion DNA fragment for the preparation of a vector. Meanwhile, a pDZ-L377K vector for the introduction of an L377K modification into the chromosome was prepared as follows: the pDZ vector (which was digested with a restriction enzyme SmaI and then subjected to heat treatment at 65° C. for 20 minutes) and the insertion DNA fragment (which was amplified by PCR above) were combined in a molar concentration ratio (M) of 1:2, and cloning was performed using an In-fusion® Cloning kit (TakaRa) according to the manual provided.

The prepared vector was transformed into the ATCC13032 strain by electroporation, and the transformed strain was subjected to a second cross-over, and thereby, a strain in which each nucleotide is substituted with a modified nucleotide on the chromosome was obtained. The strain was named as CJP1. The CJP1 was named as CA01-2307 and deposited at the Korean Culture Center of Microorganisms (KCCM), which is an international depositary authority under the Budapest Treaty, on Mar. 29, 2017, and was assigned Accession No. KCCM12000P.

In order to release the feedback inhibition of homoserine dehydrogenase (hom), which acts as the second important enzyme in the L-threonine production, the 407$^{th}$ amino acid of hom (i.e., arginine) was substituted with histidine (SEQ ID NO: 21).

More specifically, in order to prepare strains into each of which a hom (R407H) modification is introduced, PCR was performed using the chromosomal DNA of *Corynebacterium glutamicum* ATCC13032 as a template along with a primer pair of SEQ ID NOS: 22 and 23 or a primer pair of SEQ ID NOS: 24 and 25, respectively. PfuUltra® high-fidelity DNA polymerase (Stratagene®) was used as polymerase for the PCR reaction. The PCR was performed as follows: 28 cycles of denaturation at 95° C. for 30 seconds, annealing at 55° C. for 30 seconds, and polymerization at 72° C. for 1 minute.

TABLE 10

| SEQ ID NO | Sequence (5'->3') |
|---|---|
| SEQ ID NO: 22 | TCGAGCTCGGTACCCCGGATGATGTGTACTGCG |
| SEQ ID NO: 23 | GACCACGATCAGATGTGCATCATCATCGCGC |
| SEQ ID NO: 24 | GATGATGATGCACATCTGATCGTGGTCACCC |
| SEQ ID NO: 25 | CTCTAGAGGATCCCCGAGTCAGCGGGAAATCCG |

As a result, with respect to the modification of the hom gene, a 533 bp DNA fragment in the 5' upstream region and a 512 bp DNA fragment in the 3' downstream region were obtained, respectively. PCR was performed using the two amplified DNA fragments as templates along with the primers of SEQ ID NO: 22 and SEQ ID NO: 25. The PCR was performed as follows: denaturation at 95° C. for 5 minutes: 28 cycles of denaturation at 95° C. for 30 seconds, annealing at 55° C. for 30 seconds, and polymerization at 72° C. for 2 minutes; and polymerization at 72° C. for 5 minutes.

As a result, a 1.018 bp DNA fragment, which includes a modification of the hom gene that encodes an aspartokinase variant where the 407$^{th}$ amino acid (i.e., arginine) is substituted with histidine, was amplified. The amplified product was purified using a PCR purification kit (QIAGEN®) and used as an insertion DNA fragment for the preparation of a vector. Meanwhile, a pDZ-R407H vector for the introduction of an R407H modification into the chromosome was prepared as follows: the pDZ vector (which was digested with a restriction enzyme SmaI and then subjected to heat treatment at 65° C. for 20 minutes) and the insertion DNA fragment (which was amplified by PCR above) were combined in a molar concentration ratio (M) of 1:2, and cloning was performed using an In-Fusion® Cloning kit (TaKaRa) according to the manual provided.

The prepared vector was transformed into the CJP1 strain by electroporation, and the transformed strain was subjected to a second cross-over, and thereby, a strain in which each nucleotide is substituted with a modified nucleotide on the chromosome was obtained. The strain was named as CA09-0900 (Accession NO. KCCM12418P).

In order to clearly confirm the changes in the production of L-threonine and L-lysine of the above strain, a T169L modification, which showed the highest L-threonine production and the highest reduction in L-lysine production in Examples 5 and 6 with respect to the gene encoding meso-diaminopimelate dehydrogenase (DDH), was introduced thereinto. Specifically, in order to introduce the T169L modification into the CA09-0900 strain, the pDZ::ddh(mt)4 vector prepared in Example 5 was transformed into the CA09-0900 strain by electroporation, and the transformed strain was subjected to a second cross-over in the same manner as in Example 4, and thereby, a strain in which a nucleotide is substituted with a modified nucleotide on the chromosome was obtained. The resulting strain was named as CA09-0904.

The CA09-0904 strain was deposited at the Korean Culture Center of Microorganisms (KCCM), which is an international depositary authority under the Budapest Treaty, on April 25. 2019, and was assigned Accession No. KCCM12503P.

TABLE 11

Confirmation of abilities of prepared strains for producing L-threonine and L-lysine

| | Amino acid (g/L) | |
|---|---|---|
| Strain | Thr | Lys |
| CA09-0900 | 1.50 | 2.67 |
| CA09-0904 | 2.35 | 1.58 |

As a result, the strain introduced with the modification showed a decrease of L-lysine production by 1.09 g/L and an increase of L-threonine production by 0.85 g/L compared to the CA09-0900 strain (control group) (Table 11). Therefore, it was confirmed that the activity of Ddh was significantly reduced and that the weakening of the L-lysine production pathway was positive for L-threonine production.

Example 7: Preparation of Various Strains in which 169$^{th}$ Amino Acid (i.e., Asparagine) of Ddh Gene is Substituted with Different Amino Acid Through the CA09-0904 strain prepared in Example 6, it was confirmed that the strain which reduced L-lysine production has a positive effect on L-threonine production. An attempt was made to confirm whether any substitution of the 169$^{th}$ amino acid (i.e., threonine) in the ddh gene with a proteogenic amino acid other than threonine of the wild-type may increase the threonine production.

In order to introduce 19 kinds of modifications of heterogeneous nucleotide substitution including the T169L modification confirmed in Example 6, each recombinant vector was prepared as follows.

First, primers (SEQ ID NOS: 26 and 27), into which a recognition site of the restriction enzyme (XbaI) was inserted into the 5' fragment and the 3' fragment, about 600 bp apart downstream and upstream from the positions of the 505$^{th}$ to the 506$^{th}$ nucleotides of the ddh gene, respectively, were synthesized using the genomic DNA extracted from the WT strain as a template. In order to introduce the 19 kinds of heterogeneous nucleotide-substituted modifications, primers (SEQ ID NOS: 28 to 65) for substituting the 505$^{th}$ to the 506$^{th}$ nucleotides in the nucleotide sequences of the ddh gene were synthesized (Table 12).

Specifically, the pDZ-ddh(T169A) plasmid was prepared in such a form that the DNA fragments (600 bp each) located at the 5' and 3' ends of the ddh gene were ligated to the pDZ vector (Korean Patent No. 2009-0094433). The 5' end gene fragment of the ddh gene was prepared by PCR using the chromosomal DNA of the WT strain as a template along with primers of SEQ ID NOS: 26 and 28. The PCR was performed as follows: denaturation at 94° C. for 2 minutes; 30 cycles of denaturation at 94° C. for 1 minute, annealing at 56° C. for 1 minute, and polymerization at 72° C. for 40 seconds; and polymerization at 72° C. for 10 minutes. Likewise, the 3' end gene fragment of the ddh gene was prepared by PCR using primers of SEQ ID NOS: 27 and 29. The amplified DNA fragments were purified using a PCR Purification kit (Qiagen®) and used as insertion DNA fragments for the preparation of vectors.

Meanwhile, the insertion DNA fragments amplified by PCR and the pDZ vector, which was digested with a restriction enzyme (XbaI) and then heat treated at 65° C. for 20 minutes, were ligated using the In-Fusion® Cloning Kit and then transformed into E. coli DH5α. The resulting strain was plated on a solid LB medium containing kanamycin (25 mg/L). The transformed colonies in which the target gene was inserted into the vector by PCR using the primers of SEQ ID NOS: 26 and 27 were selected, and the plasmid was obtained using a conventionally known plasmid extraction method and named as pDZ-ddh(T169A).

Likewise, the plasmids were prepared as follows: the pDZ-ddh(T169V) using primers (SEQ ID NOS: 26 and 30 and SEQ ID NOS: 27 and 31); the pDZ-ddh(T169Q) using primers (SEQ ID NOS: 26 and 32 and SEQ ID NOS: 27 and 33); the pDZ-ddh(T169H) using primers (SEQ ID NOS: 26 and 34 and SEQ ID NOS: 27 and 35); the pDZ-ddh(T169R) using primers (SEQ ID NOS: 26 and 36 and SEQ ID NOS: 27 and 37); the pDZ-ddh(T169P) using primers (SEQ ID NOS: 26 and 38 and SEQ ID NOS: 27 and 39); the pDZ-ddh(T169L) using primers (SEQ ID NOS: 26 and 40 and SEQ ID NOS: 27 and 41); the pDZ-ddh(T169Y) using primers (SEQ ID NOS: 26 and 42 and SEQ ID NOS: 27 and 43); the pDZ-ddh(T169S) using primers (SEQ ID NOS: 26 and 44 and SEQ ID NOS: 27 and 45); the pDZ-ddh(T169K) using primers (SEQ ID NOS: 26 and 46 and SEQ ID NOS: 27 and 47); the pDZ-ddh(T169M) using primers (SEQ ID NOS: 26 and 48 and SEQ ID NOS: 27 and 49); the pDZ-ddh(T169I) using primers (SEQ ID NOS: 26 and 50 and SEQ ID NOS: 27 and 51); the pDZ-ddh(T169B) using primers (SEQ ID NOS: 26 and 52 and SEQ ID NOS: 27 and 53); the pDZ-ddh(T169D) using primers (SEQ ID NOS: 26 and 54 and SEQ ID NOS: 27 and 55); the pDZ-ddh(T169G) using primers (SEQ ID NOS: 26 and 56 and SEQ ID NOS: 27 and 57); the pDZ-ddh(T169W) using primers (SEQ ID NOS: 26 and 58 and SEQ ID NOS: 27 and 59); the pDZ-ddh(T169C) using primers (SEQ ID) NOS: 26 and 60 and SEQ ID NOS: 27 and 61); the pDZ-ddh(T169F) using primers (SEQ ID NOS: 26 and 62 and SEQ ID NOS: 27 and 63); and the pDZ-ddh(T169N) using primers (SEQ ID) NOS: 26 and 64 and SEQ ID NOS: 27 and 65).

TABLE 12

| SEQ ID NO | Sequence (5'->3') |
|---|---|
| SEQ ID NO: 26 | CGGGGATCCTCTAGAATGACCAACATCCGCGTAG |
| SEQ ID NO: 27 | CAGGTCGACTCTAGATTAGACGTCGCGTGCGATC |
| SEQ ID NO: 28 | TCCAGTACGCTCTCCCATCCGAAGACGCCC |
| SEQ ID NO: 29 | GGATGGGAGAGCGTACTGGACTGCCTTTTG |
| SEQ ID NO: 30 | TCCAGTACGTCCTCCCATCCGAAGACGCCC |
| SEQ ID NO: 31 | GGATGGGAGGACGTACTGGACTGCCTTTTG |
| SEQ ID NO: 32 | TCCAGTACCAGCTCCCATCCGAAGACGCCC |
| SEQ ID NO: 33 | GGATGGGAGCTGGTACTGGACTGCCTTTTG |
| SEQ ID NO: 34 | TCCAGTACCAGCTCCCATCCGAAGACGCCC |
| SEQ ID NO: 35 | GGATGGGAGCTGGTACTGGACTGCCTTTTG |
| SEQ ID NO: 36 | TCCAGTACCGACTCCCATCCGAAGACGCCC |
| SEQ ID NO: 37 | GGATGGGAGTCGGTACTGGACTGCCTTTTG |
| SEQ ID NO: 38 | TCCAGTACCCTCTCCCATCCGAAGACGCCC |
| SEQ ID NO: 39 | GGATGGGAGAGGGTACTGGACTGCCTTTTG |
| SEQ ID NO: 40 | TCCAGTACTTACTCCCATCCGAAGACGCCC |
| SEQ ID NO: 41 | GGATGGGAGTAAGTACTGGACTGCCTTTTG |
| SEQ ID NO: 42 | TCCAGTACTACCTCCCATCCGAAGACGCCC |
| SEQ ID NO: 43 | GGATGGGAGGTAGTACTGGACTGCCTTTTG |
| SEQ ID NO: 44 | TCCAGTACTCCCTCCCATCCGAAGACGCCC |
| SEQ ID NO: 45 | GGATGGGAGGGAGTACTGGACTGCCTTTTG |
| SEQ ID NO: 46 | TCCAGTACAAGCTCCCATCCGAAGACGCCC |
| SEQ ID NO: 47 | GGATGGGAGCTTGTACTGGACTGCCTTTTG |
| SEQ ID NO: 48 | TCCAGTACATGCTCCCATCCGAAGACGCCC |
| SEQ ID NO: 49 | GGATGGGAGCATGTACTGGACTGCCTTTTG |
| SEQ ID NO: 50 | TCCAGTACATGCTCCCATCCGAAGACGCCC |
| SEQ ID NO: 51 | GGATGGGAGCATGTACTGGACTGCCTTTTG |
| SEQ ID NO: 52 | TCCAGTACGAACTCCCATCCGAAGACGCCC |
| SEQ ID NO: 53 | GGATGGGAGTTCGTACTGGACTGCCTTTTG |
| SEQ ID NO: 54 | TCCAGTACGATCTCCCATCCGAAGACGCCC |
| SEQ ID NO: 55 | GGATGGGAGATCGTACTGGACTGCCTTTTG |
| SEQ ID NO: 56 | TCCAGTACGGTCTCCCATCCGAAGACGCCC |
| SEQ ID NO: 57 | GGATGGGAGACCGTACTGGACTGCCTTTTG |
| SEQ ID NO: 58 | TCCAGTACTGGCTCCCATCCGAAGACGCCC |
| SEQ ID NO: 59 | GGATGGGAGCCAGTACTGGACTGCCTTTTG |
| SEQ ID NO: 60 | TCCAGTACTCCCTCCCATCCGAAGACGCCC |
| SEQ ID NO: 61 | GGATGGGAGGGAGTACTGGACTGCCTTTTG |
| SEQ ID NO: 62 | TCCAGTACTTCCTCCCATCCGAAGACGCCC |
| SEQ ID NO: 63 | GGATGGGAGGAAGTACTGGACTGCCTTTTG |
| SEQ ID NO: 64 | TCCAGTACAAGCTCCCATCCGAAGACGCCC |
| SEQ ID NO: 65 | GGATGGGAGGTTGTACTGGACTGCCTTTTG |

Each of the prepared vectors was transformed into the CA09-0901 strain by electroporation. The 19 strains into each of which a modification of heterogeneous nucleotide substitution is introduced to the ddh gene were named as follows: CA09-0900::ddh(T169A), CA09-0900::ddh(T169V), CA09-0900::ddh(T169Q), CA09-0900::ddh(T169H), CA09-0900::ddh(T169R), CA09-0900::ddh (T169P), CA09-0900: ddh(T169L), CA09-0900::ddh (T169Y), CA09-0900::ddh(T169S), CA09-0900::ddh (T169K), CA09-0900::ddh(T169M), CA09-0900::ddh (T169I), CA09-0900::ddh(T169E), CA09-0900::ddh (T169D), CA09-0900::ddh(T169G), CA09-0900::ddh (T169W), CA09-0900::ddh(T169C), CA09-0900::ddh (T169F), and CA09-0900::ddh(T169N).

The ddh gene in the CA09-0900 strain was deleted by the method used in Example 2, and the resulting strain was named as CA09-0900::Δddh. The CA09-0900 and CA09-0900Δddh strains were used as control groups, and the selected 19 kinds of strains were cultured by the method shown below, and the concentrations of lysine and threonine and their glucose consumption rates were measured.

TABLE 13

Measurements of lysine-producing ability, threonine-producing ability, and glucose consumption rates

| Strain | Thr Conc. (g/L) | Lys Conc. (g/L) | Glucose Consumption Rate (g/hr) |
|---|---|---|---|
| CA09-0901 | 1.43 | 2.75 | 4.53 |
| CA09-0900::Δddh | 2.67 | 1.38 | 2.41 |
| CA09-0900::ddh(T169A) | 1.32 | 2.73 | 3.98 |
| CA09-0900::ddh(T169V) | 1.43 | 2.58 | 3.89 |
| CA09-0900::ddh(T169Q) | 1.38 | 2.62 | 3.91 |
| CA09-0900::ddh(T169H) | 1.67 | 2.63 | 4.23 |
| CA09-0900::ddh(T169R) | 1.72 | 2.41 | 2.44 |
| CA09-0900::ddh(T169P) | 1.81 | 2.25 | 3.16 |
| CA09-0900::ddh(T169L) | 2.48 | 1.52 | 3.97 |
| CA09-0900::ddh(T169Y) | 1.50 | 2.66 | 4.51 |
| CA09-0900::ddh(T169S) | 1.62 | 2.33 | 4.28 |
| CA09-0900::ddh(T169K) | 1.91 | 1.50 | 2.22 |
| CA09-0900::ddh(T169M) | 1.02 | 1.75 | 2.38 |
| CA09-0900::ddh(T169I) | 1.97 | 1.68 | 3.08 |
| CA09-0900::ddh(T169E) | 1.54 | 1.66 | 2.59 |
| CA09-0900::ddh(T169D) | 1.99 | 1.87 | 3.65 |
| CA09-0900::ddh(T169G) | 1.42 | 2.61 | 4.07 |
| CA09-0900::ddh(T169W) | 1.53 | 2.58 | 3.99 |
| CA09-0900::ddh(T169C) | 1.91 | 1.74 | 3.78 |
| CA09-0900::ddh(T169F) | 1.80 | 1.18 | 4.03 |
| CA09-0900::ddh(T169N) | 1.44 | 2.77 | 4.35 |

In the strain where the ddh gene is deleted, the threonine concentration was increased by 1.24 g/L and the lysine concentration was decreased by 1.37 g/L compared to its parent stain. Considering that the glucose was decreased by 46.1% P, in a case where no DDH activity is present due to the deletion of the ddh gene, the growth of the strain is inhibited although the THR production is increased and the LYS production is decreased, thus making it difficult to use the strain industrially. In the cases of strains including a modified polypeptide, in each of which the $169^{th}$ amino acid of SEQ ID NO: 1 is substituted with a different amino acid, the LYS production was decreased and the THR production was increased while the growth of the strain was maintained at a level to be applicable in the industry. That is, it was confirmed that when the ddh gene is weakened, it helps to increase the THR production while LYS production is decreased, and the ddh gene is weakened due to the change in the $169^{th}$ amino acid of SEQ ID NO: 1 (Table 13). Additionally, with respect to the modification of the $169^{th}$ amino acid, the modification where threonine is substituted with lysine results in a significant increase in the reduction of lysine production and an increase of THR production and a glucose consumption rate in a commercially available level, and was thus determined to be most effective.

Example 8: Preparation and Evaluation of Strains into which Modified Ddh and Modified dapB are Introduced in Microorganism Strain of Genus *Corynebacterium* Having Ability of Producing L-Threonine From the CA09-0904 strain prepared in Example 6, it was confirmed that the strain in which L-lysine production is reduced has a positive effect on the production of L-threonine. In order to confirm whether the ability of producing L-threonine can be further enhanced by further weakening the L-lysine biosynthesis pathway in the above strain, strains were developed.

Specifically, in order to weaken the activity of the enzyme involved in the second reaction of the L-lysine biosynthesis pathway (i.e., 4-hydroxy-tetrahydrodipicolinate reductase (dapB)), the $13^{th}$ amino acid of dapB (i.e., arginine) was substituted with asparagine (SEQ ID NO: 66).

More specifically, in order to prepare strains into which the dapB(R13N) modification is introduced, PCR was performed using the chromosomal DNA of the ATCC13032 strain as a template along with a primer pair of SEQ ID NOS: 67 and 68 or a primer pair of SEQ ID NOS: 69 and 70, respectively. PfuUltra® high-fidelity DNA polymerase (Stratagene®) was used as polymerase for a PCR reaction. The PCR was performed as follows: 28 cycles of denaturation at 95° C. for 30 seconds, annealing at 55° C. for 30 seconds, and polymerization at 72° C. for 1 minute.

As a result, with respect to the modification of the dapB gene, a 512 bp DNA fragment in the 5' upstream region and a 514 bp DNA fragment in the 3' downstream region were obtained, respectively. PCR was performed using the two amplified DNA fragments as templates along with the primers of SEQ ID NO: 67 and SEQ ID NO: 70. The PCR was performed as follows; denaturation at 95° C. for 5 minutes; 28 cycles of denaturation at 95° C. for 30 seconds, annealing at 55° C. for 30 seconds, and polymerization at 72° C. for 2 minutes; and polymerization at 72° C. for 5 minutes.

As a result, a 1,001 bp DNA fragment, which includes a modification of the dapB gene that encodes a 4-hydroxy-tetrahydrodipicolinate reductase variant where the $13^{th}$ amino acid (i.e., arginine) is substituted with asparagine, was amplified. The amplified product was purified using a PCR purification kit (QIAGEN®) and used as an insertion DNA fragment for the preparation of a vector. Meanwhile, a pDZ-R13N vector for the introduction of an R13N modification into the chromosome was prepared as follows: the pDZ vector (which was digested with a restriction enzyme SmaI and then subjected to heat treatment at 65° C. for 20 minutes) and the insertion DNA fragment (which was amplified by PCR above) were combined in a molar concentration ratio (M) of 1:2, and cloning was performed using an In-Fusion® Cloning kit (TakaRa) according to the manual provided.

The prepared vector was transformed into the CA09-0904 strain by electroporation, and the transformed strain was subjected to a second cross-over, and thereby, a strain in which each nucleotide is substituted with a modified nucleotide on the chromosome was obtained. The strain was named as CA09-0904-R13N.

TABLE 14

Confirmation of abilities of prepared strains
for producing L-threonine and L-lysine

| Strain | Amino acid (g/L) | |
|---|---|---|
| | Thr | Lys |
| CA09-0900 | 1.52 | 2.70 |
| CA09-0904 | 2.41 | 1.53 |
| CA09-0904-R13N | 3.03 | 1.08 |

As a result, the strain introduced with the modification showed a decrease of L-lysine production by 1.62 g/L and an increase of L-threonine production by 1.51 g/L compared to the CA09-0900 strain (control group), while showing a decrease of L-lysine production by 0.48 g/L and an increase of L-threonine production by 0.62 g/L compared to the CA09-0904 strain (Table 14). Therefore, it was confirmed that the weakening of the L-lysine production pathway was positive for L-threonine production.

Example 9: Preparation and Evaluation of Strains into which Modified Ddh and Modified lysA are Introduced in Microorganism Strain of Genus *Corynebacterium* Having Ability of Producing L-Threonine From the CA09-0904 strain prepared in Example 6, it was confirmed that the strain in which L-lysine production is reduced has a positive effect on the production of L-threonine. In order to confirm whether the ability of producing L-threonine can be further enhanced by further weakening the L-lysine biosynthesis pathway in the above strain, strains were developed.

Specifically, in order to weaken the activity of the enzyme involved in the final reaction of the L-lysine biosynthesis pathway (i.e., diaminopimelate decarboxylase (lysA), the $408^{th}$ amino acid of lysA (i.e., methionine) was substituted with alanine (*Biochemical and Biophysical Research Communications*, Volume 495, Issue 2, 8 Jan. 2018) (SEQ ID NO: 71).

More specifically, in order to prepare strains into which the lysA(M408A) modification is introduced, PCR was performed using the chromosomal DNA of the ATCC13032 strain as a template along with a primer pair of SEQ ID NOS: 72 and 73 or a primer pair of SEQ ID NOS: 74 and 75, respectively. PfuUltra® high-fidelity DNA polymerase (Stratagene®) was used as polymerase for a PCR reaction. The PCR was performed as follows: 28 cycles of denaturation at 95° C. for 30 seconds, annealing at 55° C. for 30 seconds, and polymerization at 72° C. for 1 minute.

As a result, with respect to the modification of the lysA gene, a 534 bp DNA fragment in the 5' upstream region and a 527 bp DNA fragment in the 3' downstream region were obtained, respectively. PCR was performed using the two amplified DNA fragments as templates along with the primers of SEQ ID NO: 72 and SEQ ID NO: 75. The PCR was performed as follows: denaturation at 95° C. for 5 minutes; 28 cycles of denaturation at 95° C. for 30 seconds, annealing at 55° C. for 30 seconds, and polymerization at 72° C. for 2 minutes; and polymerization at 72° C. for 5 minutes.

TABLE 15

| SEQ ID NO | Sequence (5'->3') |
|---|---|
| SEQ ID NO: 72 | TCGAGCTCGGTACCCGTTGGGCCTGTACTCACAG |
| SEQ ID NO: 73 | TAGCGGGAGCTCGCGGCGTAGCAGTATGCGCC |
| SEQ ID NO: 74 | TACTGCTACGCCGCGAGCTCCCGCTACAACGC |
| SEQ ID NO: 75 | CTCTAGAGGATCCCGTGCAAGGTGAACCAACTG |

As a result, a 1,035 bp DNA fragment, which includes a modification of the lysA gene that encodes a diaminopimelate decarboxylase variant where the $408^{th}$ amino acid (i.e., methionine) is substituted with alanine, was amplified. The amplified product was purified using a PCR purification kit (QIAGEN®) and used as an insertion DNA fragment for the preparation of a vector. Meanwhile, a pDZ-M408A vector for the introduction of an M408A modification into the chromosome was prepared as follows: the pDZ vector (which was digested with a restriction enzyme SmaI and then subjected to heat treatment at 65° C. for 20 minutes) and the insertion DNA fragment (which was amplified by PCR above) were combined in a molar concentration ratio (M) of 1:2, and cloning was performed using an In-Fusion® Cloning kit (TakaRa) according to the manual provided.

The prepared vector was transformed into the CA09-0904 strain by electroporation, and the transformed strain was subjected to a second cross-over, and thereby, a strain in which each nucleotide is substituted with a modified nucleotide on the chromosome was obtained. The strain was named as CA09-0904-M408A.

TABLE 16

Confirmation of abilities of prepared strains
for producing L-threonine and L-lysine

| Strain | Amino acid (g/L) | |
|---|---|---|
| | Thr | Lys |
| CA09-0900 | 1.61 | 2.51 |
| CA09-0904 | 2.63 | 1.52 |
| CA09-0904-M408A | 3.08 | 1.10 |

As a result, the strain introduced with the modification showed a decrease of L-lysine production by 1.41 g/L and an increase of L-threonine production by 1.33 g/L compared to the CA09-0900 strain (control group), while showing a decrease of L-lysine production by 0.42 g/L. and an increase of L-threonine production by 0.35 g/L, compared to the CA09-0904 strain (Table 16). Therefore, it was confirmed that the weakening of the L-lysine production pathway was positive for L-threonine production.

Example 10: Preparation and Evaluation of Strains into which Modified Ddh and Modified dapA are Introduced in Microorganism Strain of Genus *Corynebacterium* Having Ability of Producing L-Threonine From the CA09-0904 strain prepared in Example 6, it was confirmed that the strain in which L-lysine production is reduced has a positive effect on the production of L-threonine. In order to confirm whether the ability of producing L-threonine can be further enhanced by further weakening the L-lysine biosynthesis pathway in the above strain, strains were developed.

Specifically, in order to weaken the activity of the enzyme involved in the second reaction of the L-lysine biosynthesis pathway (i.e., 4-hydroxy-tetrahydrodipicolinate synthase (dapA), the 119$^{th}$ amino acid of dapA (i.e., tyrosine) was substituted with phenylalanine (Journal of Molecular biology, Volume 338, Issue 2, 23 Apr. 2004)) (SEQ ID NO: 76).

More specifically, in order to prepare strains into which the dapA(Y119F) modification is introduced, PCR was performed using the chromosomal DNA of the ATCC13032 strain as a template along with a primer pair of SEQ ID NOS: 77 and 78 or a primer pair of SEQ ID NOS: 79 and 80, respectively. PfuUltra high-fidelity DNA polymerase (Stratagene®) was used as polymerase for a PCR reaction. The PCR was performed as follows: 28 cycles of denaturation at 95° C. for 30 seconds, annealing at 55° C. for 30 seconds, and polymerization at 72° C. for 1 minute.

As a result, with respect to the modification of the dapA gene, a 538 bp DNA fragment in the 5' upstream region and a 528 bp DNA fragment in the 3' downstream region were obtained, respectively. PCR was performed using the two amplified DNA fragments as templates along with the primers of SEQ ID NO: 77 and SEQ ID NO: 80. The PCR was performed as follows: denaturation at 95° C. for 5 minutes; 28 cycles of denaturation at 95° C. for 30 seconds, annealing at 55° C. for 30 seconds, and polymerization at 72° C. for 2 minutes; and polymerization at 72° C. for 5 minutes.

TABLE 17

| SEQ ID NO | Sequence (5'->3') |
|---|---|
| SEQ ID NO: 77 | TCGAGCTCGGTACCCTTCATATAGTTAAGACAAC |
| SEQ ID NO: 78 | CGGCTTGGAGAAATAAGGAGTTACAACTAAAAG |
| SEQ ID NO: 79 | TAACTCCTTATTTCTCCAAGCCGAGCCAAGAG |
| SEQ ID NO: 80 | CTCTAGAGGATCCCGAGCCTCAAGTTCCTGCTC |

As a result, a 1,000 bp DNA fragment, which includes a modification of the dapA gene that encodes a 4-hydroxy-tetrahydrodipicolinate synthase variant where the 119$^{th}$ amino acid (i.e., tyrosine) is substituted with phenylalanine, was amplified. The amplified product was purified using a PCR purification kit (QIAGEN®) and used as an insertion DNA fragment for the preparation of a vector. Meanwhile, a pDZ-Y119F vector for the introduction of a dapA(Y119F) modification into the chromosome was prepared as follows: the pDZ vector (which was digested with a restriction enzyme SmaI and then subjected to heat treatment at 65° C. for 20 minutes) and the insertion DNA fragment (which was amplified by PCR above) were combined in a molar concentration ratio of 1:2, and cloning was performed using an In-Fusion® Cloning kit (TakaRa) according to the manual provided.

The prepared vector was transformed into the CA09-0904 strain by electroporation, and the transformed strain was subjected to a second cross-over, and thereby, a strain in which each nucleotide is substituted with a modified nucleotide on the chromosome was obtained. The strain was named as CA09-0904-Y119F.

TABLE 18

Confirmation of abilities of prepared strains for producing L-threonine and L-lysine

| | Amino acid (g/L) | |
|---|---|---|
| Strain | Thr | Lys |
| CA09-0900 | 1.48 | 2.68 |
| CA09-0904 | 2.52 | 1.57 |
| CA09-0904-Y119F | 3.31 | 0.82 |

As a result, the strain introduced with the modification showed a decrease of L-lysine production by 1.86 g/L and an increase of L-threonine production by 1.83 g/L compared to the CA09-0900 strain (control group), while showing a decrease of L-lysine production by 0.75 g/L. and an increase of L-threonine production by 0.79 g/L compared to the CA09-0904 strain (Table 18). Therefore, it was confirmed that the weakening of the L-lysine production pathway was positive for L-threonine production.

The above results suggest that a strain which includes a modified polypeptide of meso-diaminopimelate dehydrogenase, in which the 169$^{th}$ amino acid in the amino acid sequence of SEQ ID NO: 1 of the present disclosure is substituted with leucine, phenylalanine, glutamate, or cysteine, eventually has an enhanced ability of producing L-threonine through the decrease of the amount of L-lysine production and an increase of the amount of L-threonine production, compared to non-modified strains.

From the foregoing, one of ordinary skill in the art to which the present disclosure pertains will be able to understand that the present disclosure may be embodied in other specific forms without modifying the technical concepts or essential characteristics of the present disclosure. In this regard, the exemplary embodiments disclosed herein are only for illustrative purposes and should not be construed as limiting the scope of the present disclosure. On the contrary, the present disclosure is intended to cover not only the exemplary embodiments but also various alternatives, modifications, equivalents, and other embodiments that may be included within the spirit and scope of the present disclosure as defined by the appended claims.

The invention claimed is:

1. A modified polypeptide, comprising the polypeptide of SEQ ID NO: 1, in which the amino acid corresponding to position 169 of the polypeptide of SEQ ID NO: 1 is substituted with leucine, and wherein said modified polypeptide has meso-diaminopimelate dehydrogenase activity.

2. The modified polypeptide according to claim 1, wherein the meso-diaminopimelate dehydrogenase activity of the modified polypeptide is reduced compared to the meso-diaminopimelate dehydrogenase activity of the polypeptide of SEQ ID NO: 1 when measured under the same conditions.

3. A polynucleotide encoding the modified polypeptide of claim 1.

4. The polynucleotide according to claim 3, wherein the polynucleotide consists of the nucleotide sequence of SEQ ID NO: 4.

5. A microorganism of the genus *Corynebacterium*, which comprises:
   a modified polypeptide, comprising the polypeptide of SEQ ID NO: 1, in which the amino acid corresponding to position 169 of the polypeptide of SEQ ID NO: 1 is substituted with leucine, and wherein said modified polypeptide has meso-diaminopimelate dehydrogenase activity; or a polynucleotide comprising the same.

6. The microorganism according to claim 5, wherein the microorganism of the genus *Corynebacterium* further comprises one or more selected from the modified polypeptides of (1) to (3) shown below:
   (1) a modified polypeptide, wherein the activity of dihydrodipicolinate reductase is weakened;
   (2) a modified polypeptide, wherein the activity of diaminopimelate decarboxylase is weakened; and
   (3) a modified polypeptide, wherein the activity of dihydrodipicolinate synthase is weakened.

7. The microorganism according to claim 6, wherein the modified polypeptide comprises one or more selected from the modified polypeptides of (1) to (3) shown below:
   (1) a modified polypeptide of dihydrodipicolinate reductase wherein the 13$^{th}$ amino acid in the amino acid sequence of SEQ ID NO: 81, arginine (R), is substituted with asparagine (N);
   (2) a modified polypeptide of diaminopimelate decarboxylase, wherein the 408$^{th}$ amino acid in the amino acid sequence of SEQ ID NO: 82, methionine (M), is substituted with alanine (A); and
   (3) a modified polypeptide of dihydrodipicolinate synthase, wherein the 119$^{th}$ amino acid in the amino acid sequence of SEQ ID NO: 83, tyrosine (T), is substituted with phenylalanine (F).

8. The microorganism according to claim 5, wherein the microorganism has an enhanced ability of producing L-threonine compared to a non-modified strain.

9. The microorganism according to claim 5, wherein the microorganism is *Corynebacterium glutamicum*.

10. A method for preparing L-threonine, comprising a step of culturing in a medium a microorganism of the genus *Corynebacterium* comprising a modified polypeptide comprising the polypeptide of SEQ ID NO: 1, in which the amino acid corresponding to position 169 of the polypeptide of SEQ ID NO: 1 is substituted with leucine, wherein said modified polypeptide has meso-diaminopimelate dehydrogenase activity.

11. The method according to claim 10, wherein the step of culturing the microorganism further comprises a step of recovering L-threonine from the cultured medium and the microorganism.

* * * * *